AUTOMATIC TELETYPEWRITER STATION CONTROL SYSTEM

Filed April 5, 1957 6 Sheets-Sheet 1

INVENTORS A.W. KAUFMAN
C.J. VOTAW
BY R.C. Perry
ATTORNEY

Nov. 10, 1959 A. W. KAUFMAN ET AL 2,912,485

AUTOMATIC TELETYPEWRITER STATION CONTROL SYSTEM

Filed April 5, 1957 6 Sheets-Sheet 2

INVENTORS A. W. KAUFMAN
C. J. VOTAW
BY R. C. Perry
ATTORNEY

AUTOMATIC TELETYPEWRITER STATION CONTROL SYSTEM

Filed April 5, 1957 6 Sheets-Sheet 3

INVENTORS A. W. KAUFMAN
C. J. VOTAW
BY R. C. Lerry
ATTORNEY

AUTOMATIC TELETYPEWRITER STATION CONTROL SYSTEM

Filed April 5, 1957 6 Sheets-Sheet 4

INVENTORS A.W. KAUFMAN
C.J. VOTAW
BY R.C. Terry
ATTORNEY

AUTOMATIC TELETYPEWRITER STATION CONTROL SYSTEM

Filed April 5, 1957 6 Sheets-Sheet 5

INVENTORS A.W. KAUFMAN
C.J. VOTAW
BY R.C. Terry
ATTORNEY

INVENTORS A. W. KAUFMAN
C. J. VOTAW
BY R. C. Perry
ATTORNEY

United States Patent Office 2,912,485
Patented Nov. 10, 1959

2,912,485

AUTOMATIC TELETYPEWRITER STATION CONTROL SYSTEM

Arthur W. Kaufman, San Francisco, Calif., and Clarence J. Votaw, Bergenfield, N.J., assignors to Bell Telephone Laboratories, Incorporated, New York, N.Y., a corporation of New York Application April 5, 1957, Serial No. 650,889

16 Claims. (Cl. 178—4.1)

Figure 1:
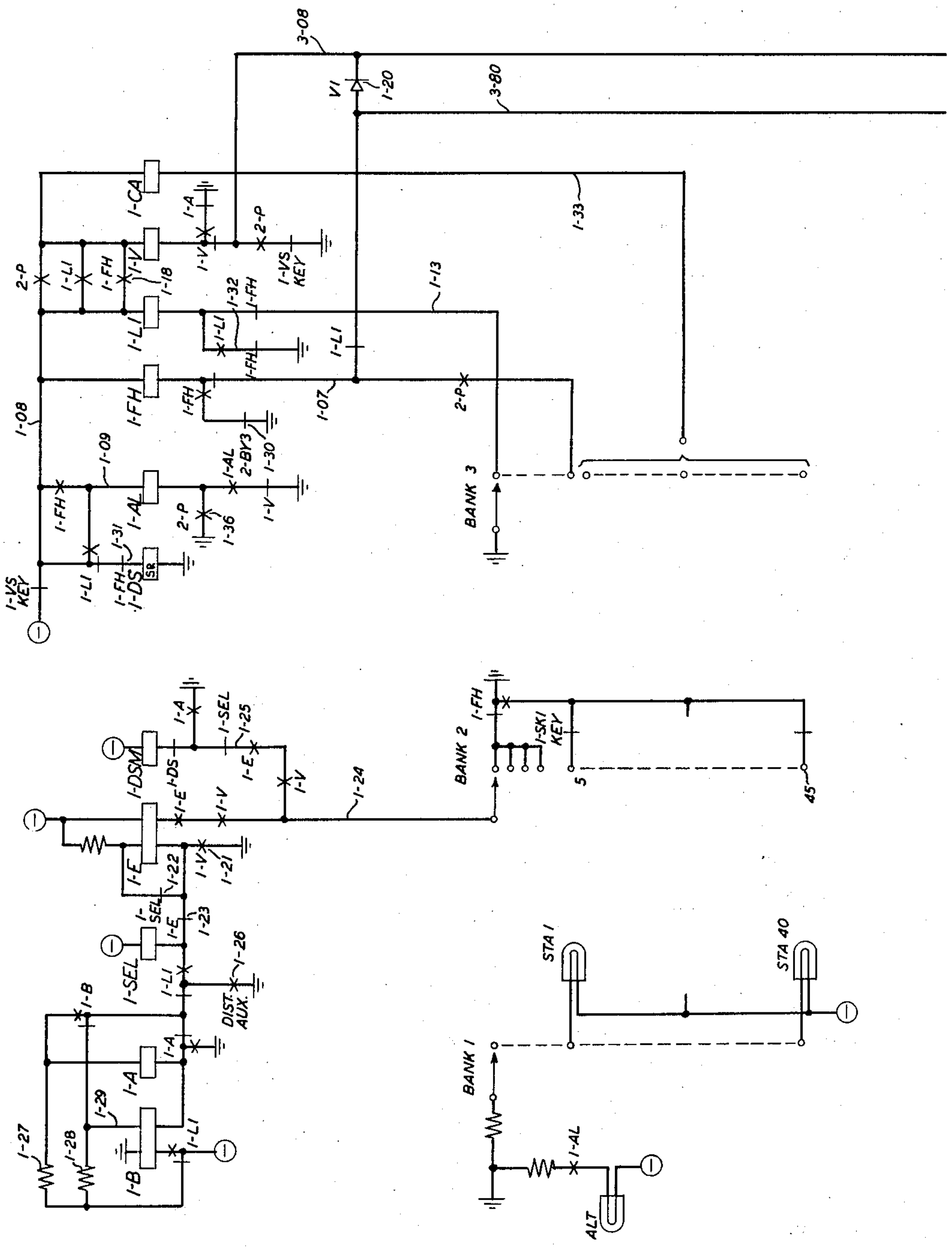

This invention relates to communication systems and particularly to an automatic teletypewriter selective calling system for private line multistation half duplex operation.

In the system one teletypewriter station on a multistation line is designated as a principal station and controls the starting of transmitters at all teletypewriter stations on the line in a prearranged sequence, by the sending of two-letter transmitter start codes on a continuous polling basis. A station having regular traffic for transmission is normally starting on the second sequential polling of that station whereas a station having priority traffic is started on the first sequential polling thereof. In the event a particular station polled does not have traffic awaiting transmission, that station generates an answer-back signal to cause the principal station to transmit the next start code.

When a station is started that station transmits, from tape, keyboard or a push-button circuit, one or more two-letter calling codes corresponding to the stations of destination of the message, thereby to place those stations in receptive condition. Each station selected for reception transmits an answer-back signal to the sending station. At the beginning of the text of a message, signals are transmitted to place all station selecting mechanisms in a non-selecting condition, and at the end of a message signals are transmitted to restore all station selecting mechanisms to the selecting condition, and to impart control of the line to the principal station.

The principal station, in addition to resuming control of the line at the end of a message from a station on the line, will also seize the line at any time that line becomes idle for a predetermined period and resume the sequential transmission of station transmitter start codes.

The present invention is directed particularly to the operation of a multistation line and it is a fundamental object of this invention to expedite, and generally improve data transmission on telegraph communication systems.

According to one aspect of the foregoing fundamental object, a general object of this invention is to improve selective calling operations in private line telegraph circuits.

A specific object of this invention is to poll stations on a line to cause the sequential starting of stations having priority traffic on a first transmission of their starting codes, and the sequential starting of stations having regular traffic on a second transmission of the identical codes.

Another specific object of this invention is to allow each station on a line to send one message each time that station is started and a related object is to maintain all stations in selective condition at all times except during transmission of the text only of that one message.

According to another aspect of the fundamental object of this invention hereinbefore recited, a general object of this invention is to transmit a two-letter telegraph code in repetitive sequence to poll stations on a telegraph line.

A specific object of this invention is the transmission by only a principal station, of an acknowledgment signal when a broadcast calling code is received by all stations on a telegraph line.

A further object of this invention is to allow a variety of transmission media to be started by the polling of stations on a telegraph line.

Another object of the invention is to cause the transmission of successive station calling codes to await transmission of an acknowledgment signal by each station as called.

This invention features a station control circuit adaptable to operation with a transmitter start circuit or a push-button calling circuit or both, for selectively controlling the transmission of transmitter start codes and station cut-on codes to the line and the generation of acknowledgment signals or message traffic signals in response thereto.

This invention also features an arrangement at a keyboard transmitting station for automatically generating a message-ready signal when that station is polled.

The invention also features an arrangement at each station for automatically generating an answer-back signal on the initial polling of that station and for preventing the generation of that signal on the second sequential polling thereof.

Another feature at each station is a priority circuit for precluding the generation of an answer-back signal on the initial polling of that station when the priority circuit is operative.

Still another feature of this invention is an arrangement at the principal station for generating an answer-back signal when the answer-back equipment at any of the stations is inoperative or a broadcast call is placed on the line.

This invention also features timing means for switching the control of the telegraph line to the principal station whenever the line becomes idle for certain predetermined periods.

An additional feature of this invention is an arrangement at each station for transmitting a message independent of the polling arrangement at the principal station.

Figure 4:
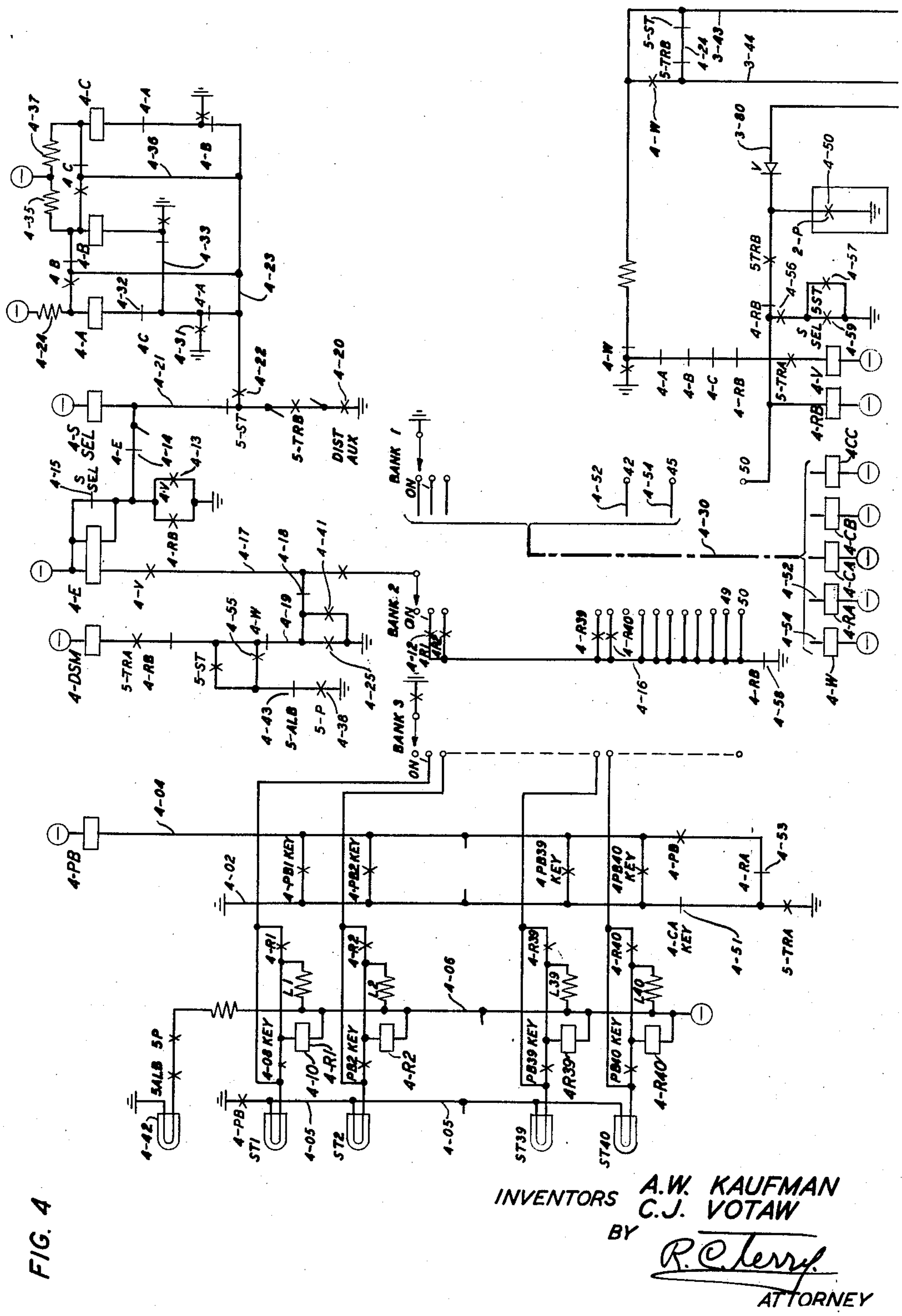
Figure 5:
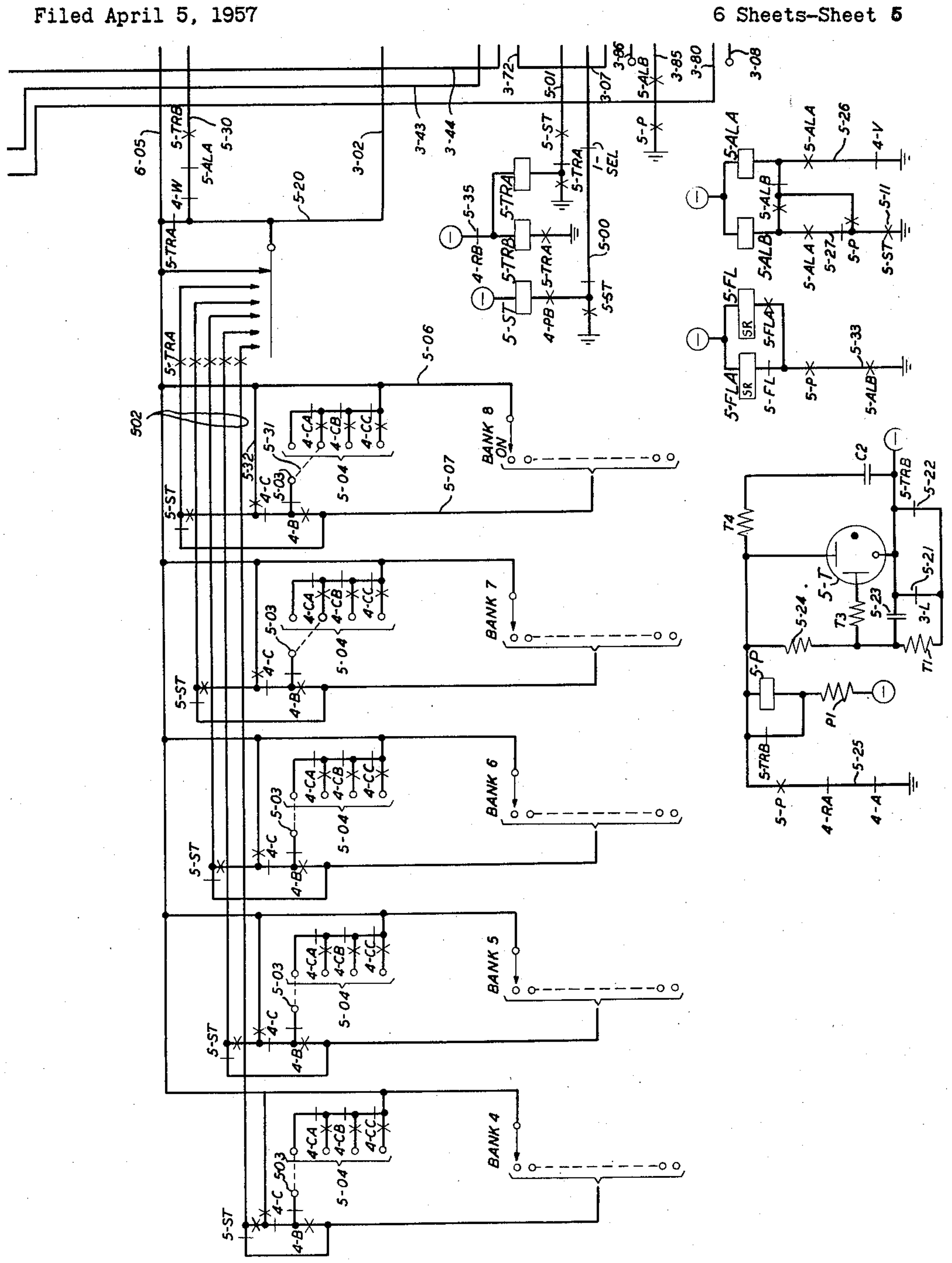
Figure 6:
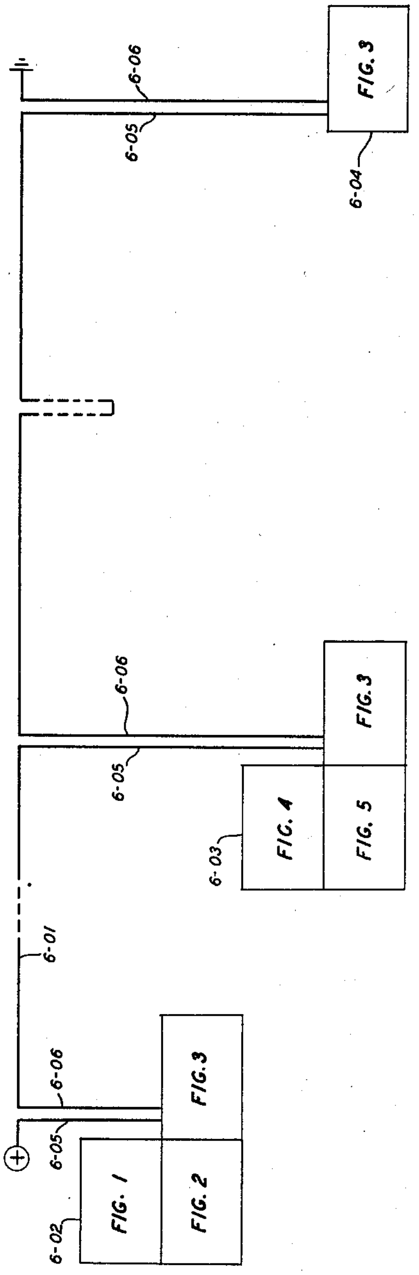

A system for accomplishing the foregoing object and others that may hereinafter be set forth or become apparent and embodying the foregoing features and others which may also be hereinafter set forth or become apparent may be fully understood by reference to the following detailed description to be interpreted in the light of the accompanying drawings wherein:

Figs. 1 through 5 when arranged in accordance with the pattern of Fig. 6 show in detached contact schematic form a typical teletypewriter selective calling system according to the present invention.

In the drawings the relay contacts are shown detached from the relay windings. The relay windings are given letter designations while the associated contacts are identified by the same letter designations and where necessary are also followed by a numerical designation identifying the individual contact. Contacts which are closed when the relay releases are represented by a single short line perpendicular to the line representing the connecting conductors, while contacts which are closed when the relay is operated are represented by a cross or x crossing the connecting conductors.

*General description*

The general features of the system will now be described with reference to Figs. 1 through 5 inclusive, when arranged as shown in Fig. 6. Fig. 6 shows in block diagrammatic form the stations and equipment connected to a multistation half duplex line 6–01. The multistation line has been shown in the drawing as comprising a separate and distinct metallic transmission conductor, however, this line may include any of the usual type transmission systems suitable for the transmission of telegraph permutation code pulses.

The half duplex line is shown extending to three stations designated 6–02 through 6–04, but may actually extend in practice to any number of stations, however, in the preferred embodiment shown herein two first-letters and twenty second-letters are used to establish the station call directing codes for a 40 station system. Each of the stations may be provided with a receiving teletypewriter, represented by selector magnet 3–40 of Fig. 3, a tape transmitter distributor, represented by numeral 3–37 of Fig. 3, a keyboard reperforator, and a keyboard sending teletypewriter, represented by numeral 3–36 in Fig. 3. While receiving and transmitting apparatus has been shown at each station and particularly in Fig. 3 of that station, it will be understood by those skilled in the art that receiving only equipment may be provided at certain stations and that transmitting apparatus only may be provided at other stations. Since the receiving and transmitting equipment operates substantially independent of each other, each station may be arranged to transmit or receive or both in accordance with that station's particular requirement.

Figure 3:
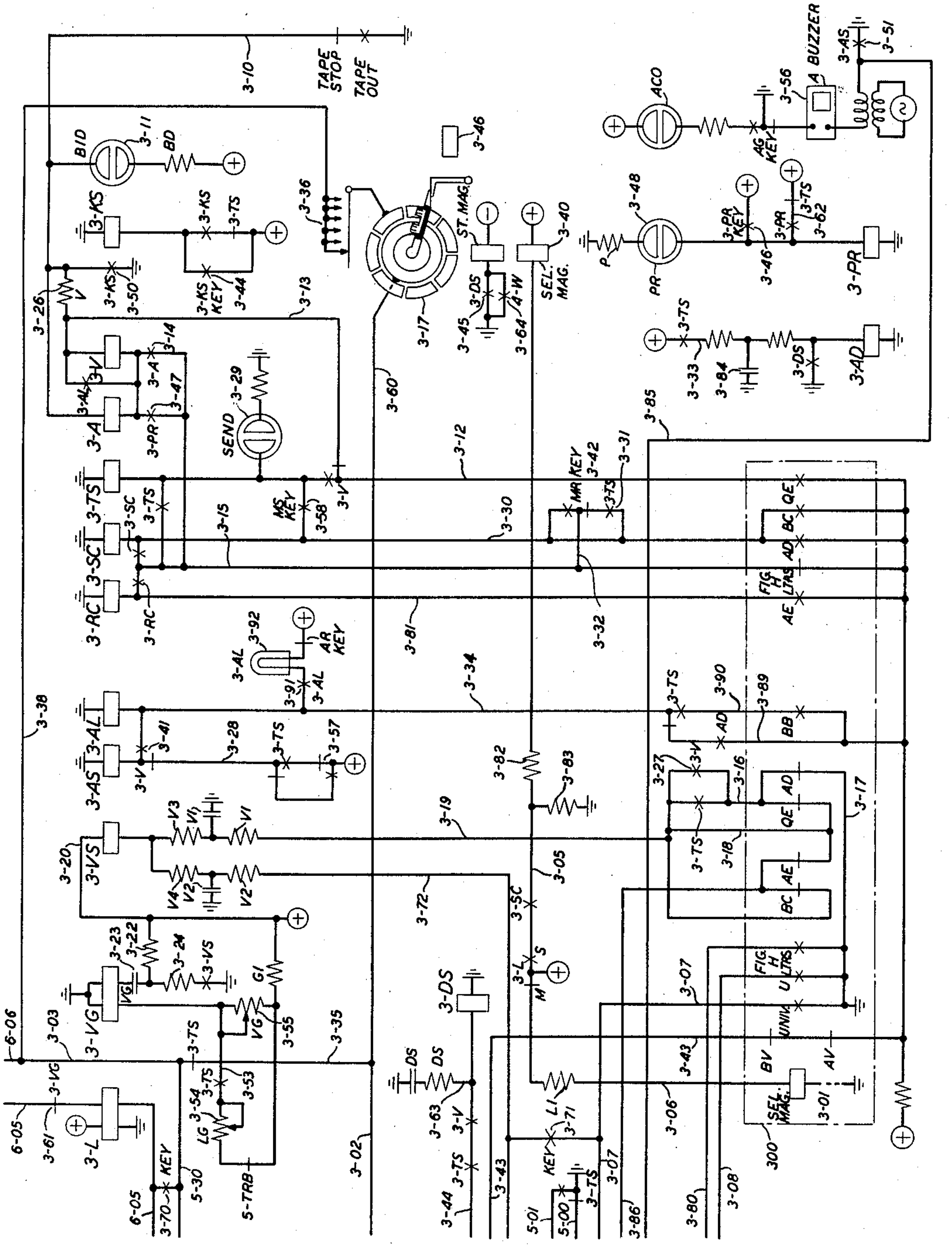

Each station is also provided with a sequential selector, represented in Fig. 3 by the rectangle labeled 3–00, which opens or closes certain of its contacts in response to signals incoming over the transmission line.

Typical apparatus suitable for use in combination with the circuits of the system described herein including a receiving teletypewriter, a keyboard sending teletypewriter, a tape sending transmitter distributor, and a sequential selector are described in detail respectively in United States Patents 2,505,729, issued April 29, 1950 to W. J. Zenner, Patent 1,965,602, issued July 10, 1934 to R. A. Lake, Patent 1,904,164, issued April 18, 1933 to S. Morton et al., and Patent 2,568,264, issued September 18, 1951, to W. J. Zenner, and the disclosures of these patents are incorporated herein by reference as part of the present specification.

Figure 2:
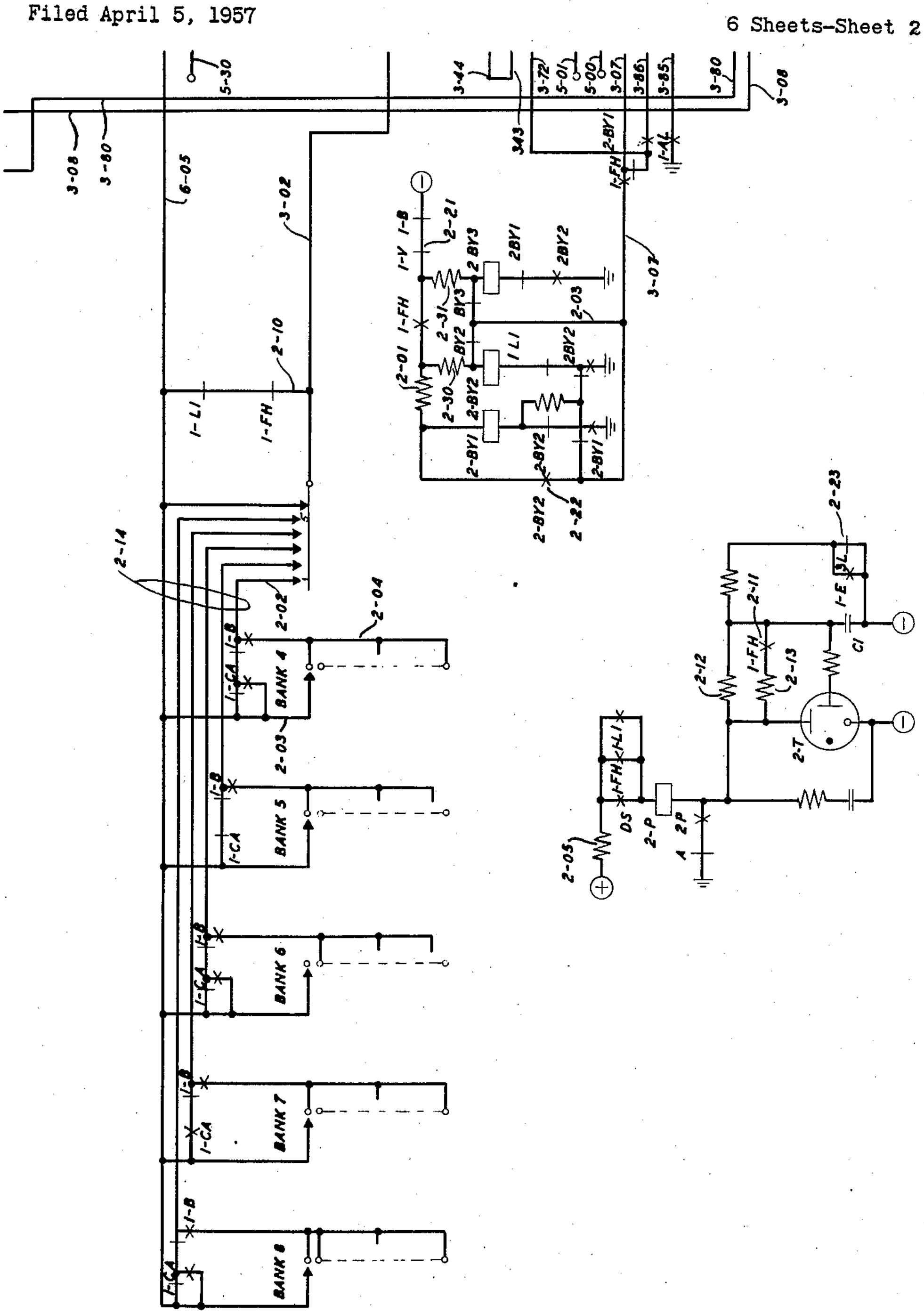

With reference to Fig. 6, station 6–02 is designated as a principal station and operates to control the starting in sequence of stations on the line having messages for transmission. The principal station 6–02 comprises Figs. 1, 2, and 3. Figs. 1 and 2 represent the transmitter start circuit which is only provided at the principal station and controls the starting in sequence of the transmitter distributor or permits the keyboard sending in sequence, at the teletypewriter stations on the half duplex multi-station private line.

The remaining stations which are referred to herein as subscriber stations to distinguish them from the principal stations 6–02, 6–03 and 6–04 are shown to comprise respectively Figs. 3, 4 and 5. Fig. 3 is the station control circuit and is provided at every station including the principal station. Fig. 3 includes message transmitting and receiving equipment and may be provided alone at any station except the principal station, at which it must have associated with it the transmitter start circuit as shown for station 6–02. The push-button control circuit of Figs. 4 and 5 may be utilized at any of the stations on the line including the principal station 6–02. The operator at a station may send call directing codes for single or multi-address messages by operating push-buttons in this control circuit.

For the purpose of this description, the push-button circuit of Figs. 4 and 5 is only shown at a subscriber station and the station control circuit of Fig. 3 is only shown once and will be described in relation to its operation at both the principal station 6–02 and at the other subscriber's stations of the system designated by numerals 6–03 and 6–04.

Accordingly, in the preferred embodiment of the invention disclosed herein a half duplex transmission line 6–01 interconnects principal stations 6–02 and subscriber stations 6–03 and 6–04 and constitutes a private line teletypewriter selective calling system. As described hereinabove, each station comprises message originating and receiving equipment, a sequential selector mechanism, and the station control circuit of Fig. 3; and in addition subscriber station 6–03 includes the push-button calling circuit of Figs. 4 and 5 and principal station 6–02 includes the transmitter start circuit of Figs. 1 and 2.

The sequential selector of Fig 3 identified by the numeral 3–00 provides the selecting features of the system. The sequential selector magnet 3–01, as will be explained hereinafter, follows all signals incoming over the line and normally opens or closes the associated selecting contacts of selector 3–00 correspondingly. However, sequential selector 3–00 is of the type that mechanically disables the selecting contacts when the end-of-address signal V Carriage Return-Line Feed is received, to prevent their operation during transmission of the text of a message, and mechanically restores to the selective condition upon receipt of the end-of-message signal Figs. H Letters.

The half duplex transmission line 6–01 terminates at stations 6–02 through 6–04 in the station control circuit of Fig. 3. The receiving loop at each station extends from the line over conductor 6–05, through a closed contact of released relay 3–VG, through the winding of line relay 3–L, thence over either conductor 2–10 if Fig. 2 is utilized or conductor 5–20 if Fig. 5 is utilized, thence over conductors 3–02, 3–35, and 3–03 to return over conductor 6–06 to the line. The loop just traced also provides the transmitting loop for the station calling code distributor 5–02 when conductor 5–20 of the push-button control circuit of Fig. 5 is open and also provides the transmitting loop for the transmitter start code distributor 2–14, when conductor 2–10 of Fig. 2 of the transmitter start circuit is open.

The transmission loop for the message transmitting equipment at a subscriber station as shown in Fig. 3 extends from the line over conductor 6–05, thence over either conductor 5–20 in the case of station 6–03 or through key contact 3–70 in the case of station 6–04, over conductor 3–02, thence over conductor 3–60 serially through tape transmitter distributor 3–37 and keyboard sending contacts 3–36, over conductor 3–38, and thence over conductor 6–06 to return to the line.

In the operation of this system, the operators at the subscriber stations need only prepare message tape and place this tape in the station transmitter, if the tape contains the address codes of the stations of destination. If the address codes are not prepared in the tape, the operator must also depress the appropriate push-button keys to establish the address codes. After depressing the priority key in the case of priority traffic, the operator need take no further action, as the orderly transmission of messages on the system on a sequential basis will be accomplished automatically.

For the purpose of presenting the description of the system in a logical order, it will be assumed that the system is in operation, that a message has just been transmitted from the last station in the polling pattern and that subscriber station 6–03 has a priority message followed by a regular message awaiting transmission.

The system is of a single message nature in that the circuit is released after transmission of each message even though the tape may be continuous and contain other messages. At the end of a message on the circuit, the end-of-message signal comprising Figs. H Letters is transmitted, which acts to place the sequential selectors at the subscriber and principal stations in a selective condition, to disconnect teletypewriter printers that had received the preceding message, and to start the sending of transmitter start patterns from the principal station. When a subscriber station seizes the circuit in response to polling by the principal station, it begins sending a series of two-letter call directing codes corresponding to the desired stations of destination followed by the Letters character. After the subscriber station transmitter distributor transmits a call directing code, it is automatically stopped and upon reception of a character V answer-back signal from the called station, that transmitter distributor is restarted to transmit the next call directing code. In the even that a V answer-back is not received in response to the transmission of an individual station calling code, the circuit will remain idle for a period of ten seconds after which a timing circuit in the principal station will time out to cause stepping of the principal station transmitter start circuit and the resumption of polling of all stations on the line. However, the operator at the sending subscriber station may generate the V signal from the teletypewriter keyboard before the end of this time-out period, thereby to return control of the circuit and omit the unresponsive station from the calling cycle. When the transmitter start circuit of the principal station seizes the circuit in response to the idle line condition, an alarm will be brought in at the subscriber station that was selected to begin transmission and the operator at that station will reset the tape to await the next polling thereof.

If all of the station call directing codes are responded to by the V answer-back signal, indicating that the desired station teletypewriters are connected to the line, the sending station will transmit an end-of-address signal comprising the characters, Carriage Return and Line Feed, which will place all of the sequential selectors on the system in a non-selecting condition. At the end of the transmitted message the end-of-message signal will place all sequential selectors in the selecting condition, and switch control of the circuit to the transmitter start circuit of the principal station which resumes polling.

Features are also included to enable a subscriber station that has control of the line to generate an acknowledgment signal in the event that a called station does not respond, and for the principal station to transmit the acknowledgment signal when a broadcast call is placed on the system.

*Typical operation of system*

As will be described hereinafter, a subscriber station upon completing a message will transmit to line 6–01 the end-of-message signals Figs. H Letters which will be repeated over conductor 6–05 to relay 3–L and selector magnet 3–01 in the station control circuit of Fig. 3 at principal station 6–02. A marking contact associated with relay 3–L in conductor 6–05 repeats the signals received by relay 3–L to selector magnet 3–01 of the sequential selector over a path extending from positive battery through the marking contact of relay 3–L, over conductor 3–04 through the winding of selector magnet 3–01 to ground.

Selector magnet 3–01 will follow the end-of-message signals and effect the closing of the Figs. H Letters make contact conductor 3–80 of the sequential selector to cause the operation of relay 1–FH in the transmitter start circuit of Fig. 1. This operating circuit is traced from ground, through the now closed Figs. H Letters contact of the sequential selector, over conductor 3–06, through the normally closed contact of normally operated relay 1–L1, over conductor 1–07 through the normally closed contact of relay 1–FH, the winding of relay 1–FH, over conductor 1–08 and through the closed contact of unoperated key 1–VS to negative battery.

*Principal station transmits start patterns*

Operated relay 1–FH immediately performs a variety of functions by the opening and closure of its associated contacts in the circuits of relays 1–DS, 1–L1, 1–V, 2–BY1, 2–BY2, and 2–BY3, start pattern distributor 2–14, bank 2 of selector 1–14, and timing tube 2–T and effectively initiates the automatic operation of the transmitter start circuit at the principal station 6–02. A detailed description of the individual functions performed appears hereinafter with relation to the over-all operation of the transmitter start circuit inasmuch as relay 1–FH locks to ground through break contact 1–30 of relay 2–BY3 and will only be released by the operation of this relay or key 1–VS.

The closure of the Figs. H Letters contact of sequential selector 3–00 of Fig. 3 also completes an operating circuit for relay 1–V through contact 1–18 of now operated relay 1–FH. The operating path extends from negative battery through a break contact of unoperated key 1–VS, over conductor 1–08, through closed contact 1–18, the winding of relay 1–V, through a closed break contact of relay 1–V, over conductor 3–08, through varistor 1–20, over conductor 3–06 and through the Figs. H Letters contact of selector 3–00 to ground.

Stepping magnet 1–SEL associated with rotary selector 1–14 comprising switching banks 1 through 8 in Figs. 1 and 2 is now operated by the application of ground through closed make contact of operated relay 1–V and closed break contact 1–23 of released relay 1–E to one terminal of its winding which has negative battery connected to the other terminal thereof. Selector stepping magnet 1–SEL effects the single stepping of selector 1–14 each time it releases and is of a type well known in the art.

Operated relay 1–SEL removes at its associated break contact 1–22, a shunting circuit normally applied to the winding of relay 1–E which now operates over a path extending from negative battery through its winding to ground applied by closed break contact 1–21 of operated relay 1–V. Relay 1–E in operating immediately releases relay 1–SEL by opening its contact 1–23 in the operating path of relay 1–SEL. The release of relay 1–SEL will correspondingly effect the release of relay 1–E by reapplying that shunt to the winding of the released relay at its contact 1–22. Thus, with relay 1–V operated the interaction to relays 1–SEL and 1–E will effect a continuous stepping of selector 1–14 corresponding to the cyclical release of stepping magnet 1–E. However, a second operating winding for relay 1–E is provided and when this winding is energized, relay 1–E will be held operated to prevent the flip-flop interaction of relays 1–E and 1–SEL.

The secondary operating path for relay 1–E which controls the stepping of rotary selector 1–14, extends over conductor 1–24 through make contacts of relays 1–E and 1–V, the wiper of bank 2 to ground on the terminals of that bank. Terminals 1 to 4 of bank 2 are connected to ground through a break contact of relay 1–FH and inasmuch as relay 1–FH is operated ground is not applied over conductor 1–24 to the secondary winding of relay 1–E for the positions 1 to 4 of bank 2. Therefore, under this condition rotary selector 1–14 will step to position 5. Rotary selector positions 1 through 4 of banks 4 through 8 in Fig. 2 are wired to code the characters Figs. H Letters V respectively on the distributor 2–14. These characters will be sent when the transmitter start circuit seizes the line after an idle line condition, as will be described hereinafter and relay 1–FH is released. When relay 1–FH is released, the distributor start magnet 1–DSM will be operated to start the distributor 2–14 when the selector is on position 1.

However, relay 1–FH is operated at this time and has opened at its contact 1–31 the operating path for normally energized slow-release relay 1–DS. The slow-releasing characteristics of relay 1–DS provides a time delay to allow the coding to be established on distributor 2–14 before the distributor start magnet 1–DSM is energized.

Operated relay 1–FH removes the shunt normally applied to the contacts of distributor 2–14 by opening its associated break contact in conductor 2–10. The rotary stepping selector is now on position 5 and ground is applied thereto by the wiper of bank 3. As is shown in Fig. 1, operating conductor 1–33 for relay 1–CA may be connected to any of the positions 5 through 50 of bank 3. Relay 1–CA is the coding relay associated with the first or common code letter of the two-letter transmitter start code and if operated it will code the letter X and when released the letter Q. If conductor 1–33 is strapped to terminals 25 through 50 only the common character for the first twenty stations will be the letter Q and for the next twenty stations the letter X.

Referring to Fig. 2 the transmission loop now extends through the contacts of distributor 2–14 and each individual contact circuit is completed through the coding circuitry of one of the rotary selector banks 4 through 8. For instance, the circuit through the first coding contact extends from conductor 6–05, over conductor 2–03, thence through either the wiper of bank 4 and over conductor 2–04 or the break or make contacts of relay 1–CA and the break contact of relay 1–B, to lead 2–02 and thence over conductors 3–01, 3–35, 3–03 and 6–06 to the line. Relay 1–B is unoperated and accordingly the determination of the open or closed contact condition repeated to the line is dependent upon the condition of relay 1–CA. With position 5 of selector bank 8 not connected to conductor 1–33, relay 1–CA is unoperated, the circuits of contacts 1, 2, 3 and 5 are closed and the circuit of contact 4 is open. Consequently, a permutation code combination having the fourth pulse of a spacing or open line nature and corresponding to the character Q is established by distributor 2–14. When the rotary selector reaches position 25 of bank 3, relay 1–CA will operate and contact 2 of distributor 2–14 will have the only open circuit and therefore the character X which has a second pulse of a spacing nature and all others marking, will be established.

As hereinbefore mentioned, the rotary selector steps repeatedly from the off-normal position to position 5, therefore, the character Q is established by distributor 2–14. If the subscriber station associated with position 5 on bank 2 does not have its skip key operated, its associated stations will not be eliminated from the start pattern. The secondary operating path of conductor 1–24 for relay 1–E will be complete to hold up relay 1–E and prevent the release of relay 1–SEL and the stepping of rotary selector 1–14. However, if key SK1 associated with position 5 was depressed or position 5 was not assigned to a particular station, the secondary operating path for relay 1–E would be interrupted and selector 1–14 would step to succeeding positions until a ground was located at a particular position.

Relay 1–DS now released, due to the open contact in its operated path associated with operated relay 1–FH, closes its associated contact in conductor 1–25 to complete an operating circuit for relay 1–DSM extending from negative battery, the winding of relay 1–DSM, closed contact of released relay 1–DS, closed contact of released relay 1–SEL, conductor 1–25, closed contact of operated relay 1–E, over conductor 1–24, through terminal 5 of bank 2, through closed contact of unoperated key 1–SK1, and through the closed make contact of relay 1–FH to ground. The distributor start magnet 1–DSM, upon being energized, releases distributor 2–14 of Fig. 2, and as the distributor starts to rotate, the distributor auxiliary contact 1–26 closes to complete an operating path for relay 1–A extending from ground, through closed contact 1–26, a closed break contact of released relay 1–L1, a closed break contact of released relay 1–A, the winding of relay 1–A, resistor 1–27, through a closed break contact of released relay 1–L1 to negative battery. Relay 1–L1 is held released by open break contacts of relay 1–FH in conductors 1–13 and 1–32. The operation of relay 1–A completes a secondary operating path for relay 1–DSM by completing a path extending from negative battery, through the winding of relay 1–DSM, through a closed contact of released relay 1–DS, and through a closed contact of operated relay 1–A to ground. The distributor 2–14 contacts will now transmit the first character Q of the start code determined by the released condition of relay 1–CA as previously described.

At the end of the fifth pulse transmitted by distributor contacts 1 to 5, the distributor auxiliary contact will open, in a manner well known in the art, to remove the shunt applied to the primary winding of relay 1–B. This grounding shunt was applied through distributor auxiliary contact 1–26, closed break contact of released relay 1–L1, closed contact of released relay 1–B, through resistor 1–27, through closed break contact of released relay 1–L1 to relay 1–B, thereby grounding both terminals of that relay. Upon the removal of this shunt an operating path for relay 1–B is complete from negative battery through the closed break contact of released relay 1–L1 through resistor 1–28 and the secondary winding 1–29 of relay 1–B to ground, through a closed make contact of operated relay 1–A. Accordingly relay 1–B operates. With reference to Fig. 2, the operation of relay 1–B will transfer the coding applied to distributor 2–14 contacts from the contacts of relay 1–CA to the terminal positions of banks 4 through 8 of stepping selector 1–14. Accordingly, the second letter codes transmitted by the control station will be determined by the strapping of the terminals on banks 4 through 8. For instance, after the first call letter Q the selector is still on step 5 and the first pulse transmitted in accordance with lead 2–02 and distributor contact 1 will be determined by the terminal connection at point 5 on bank 4. This circuit is traced from one side of the line over conductor 6–05, over conductor 2–03, through terminal 5 over conductor 2–04 through the closed make contact of operated relay 1–B, over conductors 3–02, 3–35, 3–02 and 6–06 to the line. Thus, if terminal 5 is not connected to conductor 2–04, an open condition will be transmitted to the line and if terminal 5 is connected, a closed condition will be transmitted to the line. Accordingly, on a per terminal basis the opened or closed condition thereof may be permutatively assigned for banks 4 through 8 thereby to establish a predetermined second calling character which will be transmitted by distributor 2–14 contacts to the transmission loop at each selector position.

The distributor start magnet 1–DSM, held operated by the closed contact of operated relay 1–A over a path previously traced, now permits the distributor to make another revolution and transmit to the line 6–01 the permutation code combination associated with terminal 5 of banks 4 through 8 of stepping selector 1–14. At the start of this second rotation, the distributor auxiliary contacts 1–26 close again to shunt the operating path for relay 1–A by connecting ground to the junction of resistor 1–27 and the winding of relay 1–A through the closed make contact of operated relay 1–B, and to release the locking path previously traced for relay 1–DSM. The distributor now transmits the second character of the start code which is coded by selector banks 4 to 8 in position 5. After the fifth pulse, the distributor auxiliary contacts open and inasmuch as relay 1–A is released ground is removed from conductor 1–29. Relay 1–B releases and the distributor stops.

The sequential selector at the principal station 6–02 indicated in Fig. 3 will respond to the two-letter start code, inasmuch as its selector magnet 3–01 is following signals received by line relay 3–L and close its universal contacts momentarily. The closure of the universal contact will apply ground over conductor 3–07, through the closed make contact of operated relay 1–FH, through a closed break contact of unoperated relay 2–BY1, a closed break contact of unoperated relay 2–BY2, through the winding of relay 2–BY1, through resistor 1–16, through a closed contact of operated relay 1–FH, and released relays 1–V and 1–B to negative battery, thereby to operate relay 2–BY1. Relays 2–BY2 and 2–BY3 are prevented from operating during the closure of the universal contacts by the application of shunting ground over conductor 2–03. However, when the universal contacts open at the end of the momentary closure, the shunting ground applied over conductor 2–03 is removed and an operating path for relay 2–BY2 is complete from negative battery, closed break contacts of released relays 1–V and 1–B, closed make contact of operated relay 1–FH, through resistance 2–30 and the winding of relay 2–BY2, through closed break contact of released relay 1–L1, through closed contact of released relay 2–BY2 and thence through closed contact of operated relay 2–BY1 to ground. Accordingly, relay 2–BY2 operates. Relay 2–BY3 will not operate until relay 2–BY1 releases with relay 2–BY2 coincidently operated.

*Principal station receives responses to start patterns*

The principal station now has completed the sending of the first transmitter start code for station 6–03 which will be assumed to be the common letter Q followed by the station letter E and therefore awaits an acknowledgement signal from the called station to indicate that no traffic is waiting transmission or for the called station 6–03 to seize the line and begin transmitting traffic.

As will be described hereinafter, if the outlying station has no traffic to send it will send a "no-traffic" response comprising the character V. When this character V is received by the principal station 6–02 control circuit of Fig. 3, selector magnet 3–01 of the sequential selector 3–00 will cause the V make contact of the sequential selector 3–00 to close, thereby to complete an operating path for relay 1–V extending from ground, through the closed V contact, over conductor 3–08, through the closed break contact of released relay 1–V in Fig. 1, through the winding of relay 1–V, through closed make contact 1–18 of operated relay 1–FH, over conductor 1–08, through the closed contact of released key 1–VS to negative battery. Relay 1–V in Fig. 2 operates and opens its break contact 2–21 to remove negative battery from the winding of relays 2–BY1 and 2–BY2 which release. Relay 1–V in operating also closes its contact in conductor 1–21 to reoperate relay 1-SEL over a path previously traced. As hereinbefore described, relay 1–E will now operate to cause the release of relay 1–SEL which will in turn step the selector 1–14 one position to send the next two-letter transmitter start code.

Assuming that the subscriber station 6–03 does have tape to send, the outlying station transmitter will start and will normally send a series of letter characters designating the beginning of the tape. The receipt of these characters will cause the universal contacts of the principal station 6–02 sequential selector 3–00 to close and apply ground over conductor 3–07, and through closed make contact 2–22 of operated relay 2–BY2, to shunt the operating battery applied to the winding of relay 2–BY1, and effect the release thereof. When the universal contacts subsequently open, an operating path is complete from negative battery, closed break contacts of released relays 1–B and 1–V, through resistance 2–31 and the winding of relay 2–BY3, through a closed contact of released relay 2–BY1 and a closed contact of operated relay 2–BY2 to ground, thereby to operate relay 2-BY3. Relay 2–BY3, upon operating, opens its break contact in the locking path of operated relay 1–FH thereby to release this relay. The release of relay 1–FH restores the circuit to the normal waiting condition. The appropriate called subscriber station lamp is lighted over a circuit extending from the wiper of bank 1 of selector 1–14 and through the terminal 5 corresponding to the started subscriber station and thereby visually identifies the subscriber station sending on the line.

In the event that neither a "no traffic" signal comprising the character V nor a letters character signifying the beginning of message traffic is received in response to the transmission of a start pattern, the line will go idle and relay 3–L of Fig. 2 will be in the marking condition. With reference to Fig. 2, break contact 2–23 associated with the 3–L relay will remain open during the time relay 3–L is marking, thereby to remove the shunt across condenser 2–C1 in the timing circuit of tube 2–T. Relay 1–FH is still operated and at its make contact 2–11 it places resistors 2–11 and 2–12 in parallel to charge condenser 2–C1 and the time constants of this network are such that conduction in tube 2–T will occur after relay 3–L has remained continuously marking for approximately two seconds. Conduction in tube 2–T will complete an operating path for relay 2–P extending from positive battery, through resistor 2–05, through a closed make contact of operated relay 1–FH, through the winding of relay 2–P and the plate and cathode of tube 2–T to negative battery.

Relay 2–P, operates to close its contact 1–36, thereby completing an operating path from ground, through the winding of relay 1–AL, closed make contact of operated relay 1–FH, over conductor 1–08, and through the closed contact of key 1–VS to negative battery. Thus, alarm relay 1–AL operates to sound an alarm. Operated relay 2–P will also effect the operation of relay 1–V by closing its associated contact in conductor 1–19. This latter operating path is traced from ground over conductor 1–19 through a closed contact of key 1–VS, closed contact of operated relay 2–P, closed contact of unoperated relay 1–V, the winding of relay 1–V, through contact 1–18 of operated relay 1–FH and over conductor 1–08 to negative battery. Relay 1–V operates to cause the energization of relays 1–SEL and 1–E and thereby effect selector stepping and the resumption of start pattern transmission.

The alarm signal will continue until a V letter response to the next start code pattern releases the 1–A1 relay or a successful start at an outlying station releases the 1–FH relay as hereinbefore described.

*Principal station seizes idle line*

In the event that the subscriber station is properly started relay 1–FH is released and resistor 2–12 of Fig. 2 alone appears in the timing circuit of tube 2–C1 inasmuch as the release of relay 1–FH has removed resistor 2–13 from the circuit. Under this condition if the line for any reason goes idle for a period of ten seconds, the 2–C1 condenser will be charged sufficiently by resistance 2–12 during that interval to cause conduction in tube 2–T and the operation of relay 2–P as previously described.

Relay 2–P in operating will energize relay 1–V and inasmuch as relay 1–FH is released after a successful start, the selector will automatically step to position 1.

When the selector is returned to position 1, ground on bank 1 will operate the 1–L1 relay over conductor 1–13 as previously described. The operation of relay 1–L1 will cause the operation 1–B. With reference to Fig. 2, the operation of relay 1–B effects the closure of its associated contacts in selector bank 14 to permit the next four transmitted characters corresponding to selector positions 1 to 4 to be coded solely by the selector terminal connections of banks 1 to 4. The terminals 1 to 4 of banks 4 to 8 of selector 1–14 are wired to establish respectively the permutation code combinations Figs. H, Letters, and V.

The operation of relay 1–L1 will also operate relay 1–AL in a path extending from negative battery through the unoperated 1–VS key, through closed make contact of operated relay 1–L1, the winding of relay 1–AL, through a closed contact of operated relay 2–P to ground. Thus, an alarm will be given in response to the idle line condition. The operation of relay 1–L1 also connects the distributor auxiliary contact 1–26 to selector magnet 1-SEL so that with each rotation of the distributor the selector 1–14 will step one position.

The operation of relay 1–L1 also opens the operating path to relay 1–DS which releases after 100 milliseconds, thereby to allow ground applied through bank 2 of selector 1–14 to be applied over conductors 1–24 and 1–25 to energize relay 1–DSM. The distributor will start and the distributor auxiliary contacts will operate the step magnet 1–SEL which by opening its contacts in conductor 1–25 will release relay 1–DSM. The distributor will transmit the character Figures coded by banks 4 through 8 in position 1. After the fifth pulse, the distributor auxiliary contacts 1–26 open to release selector stepping magnet 1–SEL which steps the selector to position 2. The released stepping magnet 1–SEL reoperates relay 1–DSM by closing its contact in conductor 1–25 to complete a path over conductor 1–24, through the terminals of bank 2 and the closed contact of released relay 1–FH to ground. With the selector on position 2, the distributor will now transmit the character H. Similarly when the selectors step to position 3, the characters letters will be transmitted and when stepped to position 4 the character V will be transmitted. It is necessary that the character V be transmitted at this point in the operating cycle to assure the release of any station which may have its associated transmitter locked out awaiting an answer-back signal, as will be described hereinafter.

When the selector reaches position 5 ground associated with bank 3 will be applied on conductor 1–07 to energize relay 1–FH over an operating path previously traced. Operation of relay 1–FH will cause the release of relay 1–L1 by opening its associated contact in conductor 1–13.

The transmission of start patterns will now begin in the normal orderly manner as hereinbefore described and upon the receipt of the first "no traffic" character V response or a successful start, relay 1–AL will be released to silence the alarm. In the event it is desired to remove the transmitter start circuit from service, key 1–VS is operated to remove at its contact in conductor 1–08 the negative operating battery for the relays of the transmitter start circuit.

*Subscriber station operation in response to start patterns*

Operation of the transmitter start and control circuits of principal station 6–02 has been described hereinabove in detail. A description will now be given of the operations at a subscriber station 6–03 on the system when it is started from the principal station. The reception of this message by a third subscriber station 6–04 on the system will then be described. Messages may be sent from tape or keyboard sending machines and the destination of the messages is determined at the various stations by placing at the head of each message two-letter call directive codes that designate the stations to receive the text. These call directing codes may be transmitted from the message tape, from the keyboard, or from a push-button circuit that may be provided at any station. The following description although confined to a particular subscriber station 6–03 will illustrate the sending of called directing codes by all the aforementioned means.

The selecting features of the station control circuit of Fig. 3 are obtained from switching contacts of the sequential selector identified by the numeral 3–00 and particularly from switching characters that are actuated in response to teletypewriter characters or combinations of characters. These contacts are used to control the operation of the major components of a subscriber station. Certain of the contacts of the sequential selector function if the station with which it is associated is selected in the poling process, and other of the contacts function if the station with which the sequential selector is associated is selected to receive the message. Since these selecting contacts are capable of responding to codes that are made up of characters that may occur in messages, the sequential selector is designed with features that permit it to go into a non-selecting condition in order to disable these contacts during the transmission of messages. The sequential selector also effects the connection of an associated teletypewriter to the incoming transmission loop.

A subscriber station 6–03 on the system comprising Figs. 3, 4 and 5 will send only upon the successive receipt of two of its own transmitter start codes as a normal result of the functioning of the transmitter start circuit in poling the stations on a line. If after the receipt of the first transmitter start code an end-of-message code Figs. H. Letters is received, the accumulative effect of the previously transmitted transmitter start code is nullified and two or more additional polings of the station will be required to start the transmitter distributor. Although it has been assumed that station 6–03 has a priority message followed by a regular message awaiting transmission, the following description for the purposes of an orderly presentation will cover station conditions of no traffic, regular traffic and priority traffic in that order.

Referring to Fig. 3 the operator at a station on the system will perforate in tape the message to be transmitted and will insert this tape in a transmitter distributor at that station. The insertion of the tape closes the tape-out contact in conductor 3–10 and the lowering of the tape stop arm closes the tape-stop contact in conductor 3–10. The closure of these two contacts establishes the "message-ready" condition by connecting ground over conductor 3–10 to the winding of relays 3–A, and 3–V and to the bid lamp 3–11. A circuit is complete from positive battery through bid lamp 3–11 to ground on conductor 3–10 and accordingly bid lamp 3–11 will light. Station 6–03 is now in a condition to respond to a poling from the principal station 6–02.

As described hereinbefore relay 3–L and sequential selector magnet 3–01 follow all of the transmitter start codes incoming over the transmission channel from the principal station. When the two-letter start code combination QE corresponding to station 6–03 is repeated by selector magnet 3–01, the QE make contact in conductor 3–12 of sequential selector 3–00 will close for approximately ⅓ of a character interval. The closure of make contact QE applies positive battery over conductors 3–12 and 3–13, to the winding of relays 3–A and 3–V in series. Thus, an operating path for relay 3–A is traced from positive battery over conductors 3–12 and 3–13, through the winding of relay 3–V, through the winding of relay 3–A to ground on conductor 3–10. Relay 3–A is very fast in operating and closes to its own operating battery supplied over conductor 3–15. This locking path is traced from ground over conductor 3–10, through the winding of relay 3–A, through closed make contact 3–14 of operated relay 3–A, over conductor 3–15, through the closed Figs. H Letters contact of sequential selector 3–00 to positive battery. The operation of relay 3–A in closing its associated contact 3–14 also short circuits the winding of relay 3–V by applying positive battery through contact 3–14, the one side of relay 3–V which has its other side tied to the same battery, over conductors 3–13 and 3–12. This short on the winding of relay 3–V will remain until the QE make contact in conductor 3–12 opens.

The QE break contact in conductor 3–16 opens momentarily for one character length in response to the first transmitter start code to open the operating path to normally operated relay 3–VS. This latter path is traced from ground over conductor 3–17 and break contact AD, conductor 3–16 and break contact QE, conductor 3–18, conductor 3–19, the winding of relay 3–VS, conductor 3–20 to positive battery. At approximately the same instant that the QE break contact in conductor 3–16 opens, the universal contact of sequential selector 3–00 which responds to any character, and closes a secondary operating circuit to relay 3–VS. That secondary operating circuit extends from ground through the universal contact over conductor 3–07 into the push-button control circuit of Fig. 5, and over conductors 3–21 and 3–71, through the winding of relay 3–VS to positive battery on conductor 3–20 in Fig. 3. The universal contact remains operated for approximately ⅓ of a character interval thereby to maintain relay 3–VS operated during this period. Upon the opening of the universal contact, relay 3–VS releases.

A charging path for condenser 3–23 extends from positive battery, over conductor 3–20, through resistor 3–22, condenser 3–23, the secondary winding of relay 3–VG to ground. When relay 3–VS is normally held operated from the positive battery applied over conductor 3–20, its make contact in the secondary winding of relay 3–VG is closed and grounds condenser 3–23 through resistor 3–24. Therefore with relay 3–VS operated and resistors 3–22 and 3–24 of appropriate values, condenser 3–23 is maintained at approximately a discharged condition. The current through the primary winding of relay 3–VG is of a value to hold the armature and contact 3–61 closed. When relay 3–VS releases upon the opening of the universal contact condenser 3–23 begins to charge to the full battery voltage and current flows in the secondary circuit of sufficient value to overcome the primary current to cause movement of the armature and opening of contact 3–61. At a particular point on the decay current curve contact 3–61 will release and when relay 3–VS reoperates, the discharge current in the secondary winding will aid the current in the primary winding to maintain contact 3–61 closed. The parameters and time constants of the primary and secondary winding circuits are such that the open time of contact 3–61 is equal to two selective units of the permutation code transmitted and consequently two spacing pulses are sent to the line. Inasmuch as start and first character of the permutation code combination V are spacing, a V answer-back signal is transmitted over conductor 6–05 to the principal station. Condensers V–1 and V–2 in the circuit of relay 3–VS function to hold relay 3–VS operated during the interval between the opening of contact QE and the closing of the universal contact in the sequential selector 3–00 and also to prevent possible chatter of these contacts. When contact QE in conductor 3–16 recloses, relay 3–VS reoperates over a path previously traced to place the circuit in a condition to respond to the need for another V signal.

When the QE make contact in conductor 3–12 of selector 3–00 opens at the end of the ⅓ character interval, relay 3–V will operate over a path extending from ground over conductor 3–10, resistor 3–26, the winding of relay 3–V, contact 3–14 of relay 3–A, conductor 3–15, the closed Figs. H Letters contact of selector 3–00 to positive battery. Relay 3–V is permitted to operate by the removal of positive battery previously applied over conductors 3–12 and 3–13 via the make contact QE.

Relay 3–V, upon operating, opens its associated break contact in conductor 3–13 to remove contact QE from the winding of relay 3–V. Relay 3–V operated also shunts at its closed make contact 3–27 the normally closed QE contact of conductor 3–16 in selector 3–00. Inasmuch as the break contact QE is short circuited it will prevent a V "no-traffic" signal from being sent upon the receipt of the next transmitter start code for this station as described hereinbefore relative to the first transmitter start code.

Operated relay 3–V also prepares an operating path for the transmitter start relay 3–TS by closing its associated contact in conductor 3–12 so that positive battery may be applied thereto upon the next closure of QE contacts in conductor 3–12. Operated relay 3–V also prepares an operating path for the audible alarm relay 3–AS by closing its make contact 3–41, thereby to permit the application of positive battery to relay 3–AS when relay 3–TS operates to close its associated contact in conductor 3–34.

The first transmitter start code has now been received by subscriber station 6–03 and a V no-traffic response has been transmitted to the principal station 6–02, over line 6–01 as described hereinbefore. Relays 3–A and 3–V at this time are locked operated through the Figs. H Letters contact of conductor 3–15 to positive battery and through the transmitter distributor tape stop contact in conductor 3–10 to ground. Subscriber station 6–03 is therefore prepared to receive another transmitter start code polling before starting. As described hereinbefore with relation to the principal station, the transmitter start circuit of Figs. 5 and 6 proceeds with the initial polling of all other stations on the line before initiating the second polling at station 6–03. Assuming that only regular traffic is awaiting transmission at the other stations, each station that has regular traffic will have its A and B relays locked up by the polling process and the first station in the start pattern 6–03 will be started by the second polling. However, it is obvious that if another station preceded station 6–03 in the polling cycle and has traffic, that station will send upon receipt of its second transmitter start code. At the end of a single message transmitted by the started station, the characters Figs. H Letters will be sent to momentarily open the Figs. H Letters contact in the sequential selector 3–00, thereby to remove positive battery from conductor 3–15 and to release relays 3–A and 3–V to restore all stations to a condition of requiring two more transmitter start codes before they may begin sending regular messages on the line.

*Subscriber station is started*

Under the assumed condition station 6–03, having regular traffic for transmission, is the initial station polled and if a Figs. H Letters signal has not intervened, the receipt of the second two-letter transmitter start code by station 6–03 will cause the QE break contact of selector 3–00 to open momentarily. The opening of the QE break contact in conductor 3–16 is ineffective to perform any function inasmuch as contact 3–27 associated with operated relay 3–V is closed in shunt of break contact QE as hereinabove described. However, the closure of make contact QE in conductor 3–12 completes an operating circuit for relay 3–TS which extends from positive battery through closed make contact QE, over conductor 3–12, through a closed make contact of operated relay 3–V and the winding of relay 3–TS to ground. The sending lamp 3–29 in parallel with the winding of relay 3–TS to ground, will also be lighted by the closure of make contact QE.

Operated transmitter start relay 3–TS immediately performs a variety of functions by opening and closing its associated contacts in the circuits of relays 3–SC, 3–VS, 3–AD, 3–AL, 3–AS and distributor 3–37.

Station connect relay 3–SC is operated from positive battery applied through the closed Figs. H Letters contact of sequential selector 3–00, over conductors 3–15 and 3–32, through contact 3–31 of relay 3–TS and over conductor 3–30 to its winding. Relay 3–SC closing its make contact in conductor 3–05 to complete a receptive circuit for the station teletypewriter select magnet 3–40, extending from positive battery through a spacing make contact of line relay 3–L, through the closed make contact of realy 3–SC, over conductor 3–05 and through the winding of selector magnet 3–40 to positive battery. When the transmission line is closed that spacing contact associated with relay 3–L opens and an operating circuit through selector magnet 3–40 is complete to ground through resistor 3–41 in parallel with the positive battery applied through that spacing contact. When the transmission line is open the positive battery applied to both terminals of the winding of magnet 3–40 prevents its operation. Thus, whenever relay 3–SC is operated the station teletypewriter will be connected to receive and record all signals received over the line by relay 3–L. If a copy of the message is not desired at the sending station, key 3–42 is operated to break the connection of conductors 3–30 and 3–31 and prevent the operation of relay 3–SC as a consequence of the operation of relay 3–TS as hereinbefore described.

Distributor start relay 3–DS operates over an operating path extending from positive battery in Fig. 3, through the closed AV and BV contacts of sequential selector 3–00, over conductor 3–43, conductor 2–22 in Fig. 4 comprising closed break contacts of relays 3–ST and 5–TRB, conductor 3–43 through the closed make contacts of operated relays 3–TS and 3–V and the winding of relay 3–DS to ground. Operated relay 3–DS closes its make contact in conductor 3–45 to energize the start magnet 3–46 which releases distributor 3–37. The break contact associated with operated relay 3–TS in conductor 3–35 opens to remove the shunt normally applied to distributor 3–37 and keyboard sending teletypewriter 3–36 thereby to enable sending of the line from the transmission loop of Figs. 3 and 5 as hereinbefore described.

Thus, when the transmitter start relay 3–TS is operated in response to the second transmitter start code connected by the interaction of relays 3–A and 3–V, a station receiving teletypewriter is connected to the line and the station automatic tape distributor is started and connected into the line transmission loop. The foregoing description applies to any station that intends to transmit the message address codes and text from an automatic tape distributor and consequently the push-button control circuit of Figs. 4 and 5 is by-passed and not utilized. It is therefore obvious that a subscriber station may comprise only the station control circuit of Fig. 3 with key 3–70 closed if address codes are transmitted from the tape.

In the event a subscriber station has priority traffic for transmission, a push-button priority key identified by numeral 3–46 in Fig. 3 is depressed, when that station control circuit is idle and relay 3–TS is released, to apply positive battery to grounded relay 3–PR the priority relay which operates and to grounded priority lamp 3–48 which lights. Operated relay 3–PR closes its break contact in conductor 3–62 and locks operated in parallel with lamp 3–48 through the closed break contact of unoperated relay 3–TS. Operated relay 3–PR also closes its make contact 3–47 in the winding circuit of relays 3–A and 3–V to apply positive battery through the Figs. H Letters contact of selector 3–00 and over conductor 3–15 to the grounded relays 3–A and 3–V, thereby to operate these relays. In the foregoing description relative to regular traffic at a station, relays 3–A and 3–V were not operated until a first transmitter start code was received, however these relays are immediately energized by the depression of the priority key. Thus, a station having its priority key depressed will respond to the first transmitter start code it receives and will immediately operate the transmitter start relay 3–TS to energize the station receiving and transmitting equipment.

If subscriber station 6–03 desires to send from keyboard transmitter 3–37 rather than from the automatic tape distributor 3–37, key 3–49 is depressed to close its associated make contact and apply positive battery to grounded keyboard sending relay 3–KS. Relay 3–KS operates to lock to positive battery under the control of the closed break contact of released transmitter start relay 3–TS. The "message-ready" condition described hereinabove is established by the operation of relay 3–KS in closing its associated make contact 3–50 to apply ground over conductor 3–10 to the winding of relays 3–A and 3–B and bid lamp 3–11. The response of the control circuit upon receipt of its first transmitter start code under the condition of keyboard sending will be identical with that previously traced for automatic tape transmission, however when relay 3–TS is operated in response to the second polling, its associated break contacts in the operating conductor of relay 3–KS will open to release that relay which in turn will release relays 3–A and 3–V and bid lamp 3–11 at its contact 3–50. Under the condition of relays 3–A and 3–V released and relay 3–TS operated, operating path 3–28 for relay 3–AS will be complete and cause the operation of that relay. Operated relay 3–AS will close its associated contact 3–51 to complete an operating path for buzzer 3–56 which alarms to notify the operator that she must begin transmitting.

When the subscriber station sends from the automatic tape distributor 3–37 the energization of start magnet 3–46 as previously described immediately begins the transmission of message codes over the line and principal station 6–02 upon recognizing that something other than a V "no-traffic" response has been transmitted from the started station, disconnects its transmitter start code distributor and awaits the end-of-message signal or a ten second idle condition before seizing the line. However, when the started station desires to send from a keyboard, provision is made to send a Letters signal over the line to advise the principal station that a message is awaiting transmission at that station. Relay 3–TS in operating also closes its associated make contact in conductor 3–53, thereby to connect resistor 3–54 in parallel with resistor 3–55 in the primary winding of relay 3–VG. Consequently, the biasing current in the parallel winding of relay 3–VG is increased and when the secondary winding of that relay is energized as a result of the charging condition of condenser 3–23, as hereinbefore described with relation to the generation of the V answer-back signal, the period of its effectiveness will be equal to one selecting interval of a teletypewriter character rather than two, due to the increased bias in the primary winding, and accordingly, contact 3–61 of conductor 6–05 will only open for one selecting interval, thereby to transmit the permutation code combinations Letters over the line. Principal station 6–02 will now wait for the end-of-message signal or for a ten second idle line condition before seizing control of the circuit.

*Subscriber station transmits call-directing codes from tape and keyboard*

When the station sends call-directing codes from the automatic tape distributor 3–37, the distributor is stopped after each individual code and is not restored until a V answer-back signal is received from the called station. All stations on the line which receive call-directing codes require either the letter A or B for the first or common character of the call-directing code. Sequential selector 3–00 of Fig. 3 at the sending station 6–03 will open its break contacts AV or BV upon receipt of the first letter A or B in the call-directing code by the selector magnet 3–01. The opening of either contact AB or BV in conductor 3–43 will open the energizing circuit to distributor start relay 3–DS previously traced. Relay 3–DS released, opens the operating circuit of start magnet 3–46 to stop the transmitter distributor. Immediately after sending the call-directing code, the letters signal is sent from the tape and the resistor-condenser delay circuit of conductor 3–63 in parallel with conductor 3–44 and relay 3–DS delays the release of relay 3–DS to insure that the letters character will be sent before the distributor is stopped.

The transmitter distributor will not restart until a V answer-back signal is received from the called station indicating that the called station is ready to accept transmission. Upon receipt of the V character by selector magnet 3–01 in selector 3–00, the AB or BV break contact will be mechanically unlatched to close and reoperate relay 3–DS to restart the transmitter distributor. The foregoing process is repeated until all call-directing codes of the desired stations of destination have been sent and acknowledged.

The tape will also contain at the end of the call-directing characters and end-of-address signal comprising Carriage Return and Line Feed which, when received by select magnet 3–01 subsequent to the V answer-back signal from the last called station, will mechanically unlock the sequential selector 3–00 and place all stations in the non-selecting condition so that the text of the message will not cause the sequential selectors to perform operative functions.

At the end of the message, a Figs. H Letters code is sent from the tape by the transmitter distributor 3–37. The receipt of this signal by selector magnet 3–01 will cause the Figs. H Letters contacts of the selector 3–00 to open in conductor 3–15, thereby to release relays 3–A, 3–B and 3–TS. Transmitter start relay 3–TS released, opens its break contact in conductor 3–44 to release relay 3–DS which in turn releases distributor start magnet 3–46 to cause the transmitter distributor to stop sending. The sending lamp 3–11 is also extinguished by this action and the transmitter start relay 3–TS break contact is again reclosed in conductor 3–35 to short-circuit the contacts of distributors 3–36 and 3–37. Relay 3–SC also releases to prevent teletypewriter selector magnet 3–40 from following signals received by line relay 3–L. Relays 3–AD, 3–AL and 3–AS are also returned to normal.

With keyboard sending, the operator at the sending station transmits her own call-directing code first to place her station in selective condition, and after each call-directing code she will observe on her copy of the message that a V answer-back signal has been received. The operator silences the buzzer by operating transfer key 3–57 in the buzzer operating circuit.

At the end of the message, under a condition of keyboard transmission, the operator types Figs. H Letters which will release relay 3–DS, and selector magnet 3–40, to restore the circuit to the idle condition. This condition is indicated to the operator by buzzer 3–56 which will be operated by relay 3–AS which operates from positive battery through a shunting path completed by contacts associated with operated key 3–57, over conductor 3–28, through closed contact of released relay 3–V, the winding of relay 3–AS to ground. The buzzer may be restored to normal by releasing key 3–57.

Under emergency circumstances, for example, when the transmitter start circuit for a particular line is unoperative for any reason, provision is made for the connection of the subscriber station to an idle line. Key 3–42 is first operated to close its associated make contact, thereby to complete a circuit from positive battery, over conductor 3–15, conductor 3–32, the make contact of key 3–42, over conductor 3–30, through the winding of relay 3–SC to ground. Relay 3–SC, upon operating, closes its contact in conductor 3–05 so that selector magnet 3–40 may follow signals incoming over the line. When the operator observes that the line is in an idle condition, she will operate priority key 3–46 and manual sending key 3–58 momentarily. The operation of key 3–46, the priority key, immediately operates relays 3–A and 3–V, as previously described, if tape is in the transmitter and the tape stop and tape out contacts of conductor 3–10 are in the normal condition, thereby to prepare the operating path for relay 3–DS, as previously described. The operation of the manual sending key 3–58 closes its associated break contact to apply the positive battery previously traced for conductor 3–30 to the winding of relay 3–TS over conductor 3–12. Relay 3–TS operates and in turn operates relay 3–DS to start the transmitter distributor.

A brief description will now be given of the alarm circuitry associated with the conditions of failure of a V answer-back signal, tight or torn tape, and on occurrence of a break or the receipt of a double blank signal.

If after sending a station call-directing code a V answer-back is not received, the AV or BV break contacts in sequential selector 3–00 will not reclose in the manner hereinabove described, therefore, relay 3–DS will remain released. Relay 3–AD was previously operated over conductor 3–33, through the closed break contact of operated relay 3–TS. With relay 3–DS now released, the grounding shunt normally applied through the break contact thereof to the winding of relay 3–AD is removed and accordingly relay 3–AD operates. If the idle line condition remains for ten seconds the transmitter start circuit times out and sends the signals Figs. H Letters V, as previously described, which effects the opening of operating conductor 3–15 and the release of the transmitter start relay 3–TS. Inasmuch as relay 3–AD is slow to release due to the discharge time of capacitor 3–84, its contacts in conductor 3–89 will remain closed for a sufficient period to provide an operating circuit for relay 3–AL extending from positive battery through closed make contact of relay 3–AD, closed break contact of released relay 3–TS, over conductors 3–89 and 3–34 and through the winding of relay 3–AL to ground. Operated relay 3–AL closes its associated make contact 3–91 to lock through the AR key to positive battery and to light alarm lamp 3–92. Operated relay 3–AL also closes its associated contact 3–93 in shunt with the winding of relay 3–V, thereby to prevent the operator from sending until the AR key is operated after the tape has been reset.

If while sending the tape should become tight or torn, relay 3–V will release due to the opening of the tape-out contact in conductor 3–10. Released relay 3–V opens its contact in conductor 3–44 to release distributor start relay 3–DS which opens the circuit of start magnet 3–46 to stop the transmitter distributor. With relay 3–V released, and relay 3–TS operated, a circuit over operating conductor 3–28 will be complete to energize relay 3–AS which will sound a buzzer in a manner hereinabove described. Relay 3–AD will now operate with the release of relay 3–DS and if the idle line condition remains for ten seconds, relay 3–AL will operate and perform the identical functions to that described with relation to the failure of a V answer-back signal.

In the event a break occurs on the circuit or a double blank signal is received by selector magnet 3–01, make contact BB in conductor 3–92 will close to operate relay 3–AL through the closed make contact of operated transmitter start relay 3–TS, over conductor 3–34. Relay 3–AS is also operated in parallel with relay 3–AL, through closed make contact 3–41 of operated relay 3–V. Thus, the buzzer is operated, alarm relay 3–92 is lit, and relay 3–V is released as hereinabove described. If the break is momentary the operation of the AR key will disable the alarm circuitry, however, if the break is continuous the alarm lamp 3–92 will flash as long as the break persists.

The foregoing describes the sending of station call-directing codes from tape or from a teletypewriter keyboard, however the system is also provided with an optional arrangement for sending the two letter codes from the push-button control circuit shown in Figs. 4 and 5 at station 6–03. A description of the push-button circuit appears after the following description of operations at a called station on the system in response to station calling codes and message signals transmitted by a started station from tape, keyboard or push-button means.

*Operation at receiving subscriber station*

In describing the reception of a message at a subscriber station it will be assumed that started station 6–03 has sent by tape, keyboard or push-button, the calling code for subscriber station 6–04 comprising Figures 3 only with key 3–70 closed.

The connection of a teletypewriter to the line and the generation of the V answer-back signal at the called receiving station 6–04 is similar to the operations hereinbefore described with relation to sending station 6–03 in responding to transmitter start codes, and the AD contacts of sequential selector 3–00 operate to perform functions at the receiving stations identical to those performed by contacts QE at the started sending station.

Sequential selector magnet 3–01 repeats the two-letter call-directing code received by line relay 3–L and effects momentary closure of the corresponding make contact AD in operating conductor 3–30 to operate relay 3–SC, Station connect relay 3–SC operates, as previously described, to close its associated contact in conductor 3–05 to permit station teletypewriter select magnet 3–40 to follow and record signals incoming over the line, and locks through the Figs. H Letters contact of selector 3–00.

The AD break contact in conductor 3–17 opens momentarily for one character interval thereby interrupting the normally closed operating circuit for relay 3–VS extending from ground, over conductor 3–17 serially through break contacts AD and QE, over conductors 3–18 and 3–19, through the winding of relay 3–VS and over conductor 3–20 to positive battery. At the instant the AD break contact opens, the universal break contact of selector 3–00 closes to complete a secondary operating circuit for relay 3–VS extending from ground, through the universal contact, over conductor 3–07, through closed make contact of key 3–71 inasmuch as Figures 3 is used alone at station 6–04, over conductor 3–72 to the winding of relay 3–VS.

The operation of the AD break contact in combined action with the universal contact causes the 3–VG relay to generate and send on the line a V signal to indicate that the associated station teletypewriter has been connected to the line, in an identical manner to that hereinbefore described with relation to the V signal "no-traffic" response to the transmitter start circuit.

Station 6–04 is now connected to the line and will record all incoming traffic including the call directing codes of other stations. At the end of the address, and subsequent to the V answer-back signal from the last-called station, sending station 6–03 transmits Carriage Return Line Feed which mechanically places the sequential selector 3–00 at station 6–04 in a non-selecting condition. As the message is transmitted, line relay 3–L and teletypewriter selector magnet 3–40 follow all incoming signals on the line. At the end of the message sending station 6–03 transmits Figs. H Letters which causes sequential selector 3–00 to change mechanically from the non-selecting condition to the selecting condition and also effects operation and opening of the Figs. H Letters contact of that sequential selector. The opening of the Figs. H Letters contact in operating conductor 3–15 of relay 3–SC effects the release of that relay and the disconnection of the teletypewriter select magnet 3–40 from the line.

In the event sending station 6–03 desires to send to all stations on the system on a broadcast message basis, it sends a single call directing code comprising characters BC which applies positive battery to grounded station connect relay 3–SC over conductor 3–30 at all subscriber stations on the line. This action effects the simultaneous connection of all stations receiving equipment to the line. The BC break contacts of sequential selector 3–00 are mechanically rendered ineffective at all subscriber stations, therefore, none of these subscriber signals generate a V answer-back signal to the broadcast code. However, at the principal station the BC contacts are effective and operate in combined action with the universal contact at the principal station 6–02 to cause the 3–VG relay thereat to generate and send on the line a V answer-back signal to release the sending station 6–03 transmitter. In the principal station the operating path for relay 3–VS extends from ground over conductor 3–17, serially through break contacts AD, QE, AE and BC, over conductor 3–19, through the winding of relay 3–VS, over conductor 3–20 to positive battery. Accordingly, the opening of the BC contact in the path just traced opens the operating circuit of relay 3–VS in a manner identical to that described with relation to contacts QE and AD as previously described.

Thus, in the case of a broadcast message, the V answer-back signal is generated at only the principal station 6–02.

It is also to be noted with reference to sequential selector 3–00 that break and make contacts AE, which would correspond to another pattern of transmitter start codes having the first letter A rather than Q or a routing code, operate in a manner identical to contacts QE as previously described, to operate relay 3–RC corresponding to relay 3–SC and to generate the answer-back signal.

*Push-button control system for sending station codes*

When it is desired to send call-directing codes from the push-button circuit of Figs. 4 and 5, the operator at a subscriber station determines the addressees of the message and depresses the corresponding push-buttons, and then inserts the tape and lowers the stop arm of the automatic tape distributor or depresses key 3–KS in the station control circuit if keyboard transmission is to be utilized. At a subscriber station the push-button equipment will begin functioning when the appropriate transmitter start pattern for that station has been received. The operator may also operate the priority key 3–PR if priority traffic is awaiting transmission at that station.

The push-button equipment then sends the first call-directing code and waits for the V answer-back signal prior to proceeding with the sending of the next call-directing code. No answer-back signal is expected if the code is that of a station on another line to which the message is to be routed. After all codes have been sent, the equipment sends Carriage Return Line Feed Letters followed by the text of the message to be transmitted.

At stations equipped with an automatic tape sending machine, tape transmission begins automatically. When the tape feeds out of the transmitter, the sixth pin stops the transmitter. The push-button circuit then notes a two-second idle condition, sends Figs. H Letters and then restores to normal. If the tape had contained Figs. H Letters, the circuit would have noted this fact and restored to normal without sending Figs. H Letters.

At stations equipped with a keyboard machine, the equipment provides a ten-second interval in which to start transmission. The circuit returns to normal upon the receipt of Figs. H Letters from the keyboard machine or from the transmitter start circuit after ten seconds of idle time. If an expected answer-back is not received within two seconds, the push-button circuit will repeat the code. If an answer-back is not received in response to the repeated station calling code, the push-button circuit alarms, stops, and flashes a lamp corresponding to the station failing to acknowledge.

The operator may elect to omit the unstarted station by sending the V answer-back signal from her keyboard. The push-button circuit then proceeds to send the next calling code. If, at any time, the circuit is idle for ten seconds, the transmitter start circuit will send Figs. H, Letters V and resume the sending of transmitter start patterns. The push-button circuit is restored to normal by the receipt of Figs. H Letters signals from the automatic tape distributor or from the keyboard machine.

Figs. 4 and 5 comprise the push-button calling circuit, and when arranged with Fig. 3, as shown in Fig. 6, show the outlying station adapted for transmission of calling codes by push-button operation. With line 6–01 idle and the push-button circuit in the normal condition, stepping selector 4–01 comprising banks 1 through 8 in Figs. 4 and 5 is on its off-normal step, as shown.

The station attendant desiring to send messages over the line determines the addresses of stations of destination and momentarily operates the corresponding push-buttons in Fig. 4. Push-button 1 designated as 4–PB1 will be assumed to correspond to station 6–04, one of the stations of destination of the message. The operation of key 4–PB1 operates relay 4–PB, over a path extending from ground, over conductor 4–02, through relay 4–PB1, break contact 4–03, over conductor 4–04, through the winding of relay 4–PB to negative battery. Relay 4–PB, upon operating, closes its associated contact in conductor 4–04 to lock through closed break contacts of relays 4–ST, 4–RA and 4–CA to ground on conductor 4–02. Operated relay 4–PB also closes its associated break contact in the operating circuit of relay 5–ST to complete an energizing path for this relay extending from negative battery, through the winding of relay 5–ST, closed break contact of operated relay 4–PB, overconductor 5–00, through closed break contacts of unoperated relays 5–ST and 4–S, and through closed break contact of relay 3–TS to ground in Fig. 3.

The operation of relay 4–PB also supplies ground to all of the station lamps designated 4–ST 1 through 10 over conductor 4–05. Thus with push-button 4–PB1 depressed, an operating circuit is completed from negative battery, over conductor 4–06, through resistance 4–R1, through make contact 4–08 associated with key 4–PB1, through the winding of lamp 4–ST1, and the closed contact of operated relay 4–PB in conductor 4–05 to ground, and therefore lamp 4–ST1 and relay 4–R1 are energized.

The operation of relay 5–ST prepares the push-button circuit for operation when the station control circuit of Fig. 3 responds to a transmitter start signal. As was indicated with relation to push-button 4–PB1, the depression thereof and the operation of relay 4–PB closes a circuit through the corresponding station lamp and the corresponding R relay of the R relay series. For example, with key 4–PB1 depressed, lamp 4–ST1 lights and relay 4–R1 operates and locks over a path extending from negative battery, conductor 4–06, the winding of relay 4–R1, through the closed contact of operated relay 4–R1 identified by numeral 4–10, over conductor 4–11, through the winding of lamp 4–ST1, over conductor 4–05, through the closed break contact of operated relay 4–PB to ground. Thus the station lamp 4–ST1 and the associated station relay 4–R1 will remain operated after the push-button 4–PB1 is released.

Relay 4–R1, upon operating, closes its associated contact in bank 2 of selector 4–01 designated on Fig. 4 as contact 4–12, thereby to mark the position at which the selector must stop in order that the call-directing code for the corresponding station will be sent. Similarly, the other push-buttons which are operated will also have their corresponding station lamps and R relays operated and will further mark their corresponding positions on bank 2 by the closure of contacts associated with their R relays. A bid for the transmission circuit is completed by the operator placing the message tape in the transmitter and lowering the transmitter stop arm or by operating the 3–KS key in the station control circuit in the case of keyboard sending.

*Sending the call-directing codes*

When a subscriber station has been placed in a bid condition and is polled by principal station 6–02 as described hereinbefore, the receipt of the transmitter start code of that subscriber station will cause the operation of the transmitter start relay 3–TS in the station control circuit of Fig. 3. The operation of relay 3–TS will close its associated make contact in conductor 5–01 to complete a circuit from ground over conductor 5–01, through the closed make contact of operated relay 5–ST, closed break contact of unoperated relay 5–TRA through the winding of relay 5–TRA, and through the closed break contact of released relay 4–RB to negative battery. The operation of relay 5–TRA will cause the immediate operation of relay 5–TRB by closing its associated contact in the operating path of that relay.

When the push-button calling circuit is to be utilized at a station, the transfer relays 5–TRB and 5–TRA operate to transfer the appropriate leads from sequential selector 3–00 of Fig. 3 to the push-button circuit which will now control the sending of station cut-on codes.

Operated relay 5–TRA effects the operation of relay 4–V in Fig. 4. This latter operating path is traced from negative battery, through the winding of relay 4–V, through the closed make contact of operated relay 5–TRA, over operating conductor 4–12, through closed break contacts of released relays 4–RB, 4–C, 4–B and 4–A through closed break contact of released relay 4–W, and over conductor 3–43 through closed AV and BV contacts of sequential selector 8–00 to ground.

Operated relay 4–V closes its associated contact 4–13 to complete an operating circuit for relay 4–SEL extending from ground through closed contact 4–13, through contact 4–14 of released relay 4–E, and through winding of relay 4–S to negative battery. Relay 4–S is the stepping magnet of selector 4–01 comprising banks 1 through 8 and effects the single stopping of selector 4–01 each time it releases. Operated relay 4–S opens its associated contact 4–15 to remove a shunt from the winding of relay 4–E and permits operation of that relay over a path extending from ground, through contact 4–12 of operated relay 4–V, and the winding of relay 4–E to negative battery. Relay 4–E, in operating, opens its associated contact 4–14, thereby interrupting the operating path previously traced for relay 4–S and consequently relay 4–S releases. Relay 4–S, in releasing, steps the selector 4–01 from the off-normal position to position 1. The release of relay 4–S effects the release of relay 4–E by closing its associated contact 4–15 to reapply the shunt across the winding of relay 4–E. Relay 4–E, in releasing, will again close its contact 4–14 to complete an operating path for the operation of relay 4–S. This series of operations and release of relay 4–S will continue with a stepping of the selector 4–01 upon each release of relay 4–S until the selector reaches a position associated with bank 2 wherein ground will be applied to the secondary winding of relay 4–E to maintain this relay operated.

Inasmuch as it has been assumed that push-button 4–PB1 was depressed to operate relay 4–R1, contact 4–12 associated with this relay will be closed when the wiper of bank 2 reaches position 1. At this point an operating circuit for relay 4–E is completed from positive battery, over conductor 4–16, through the closed bank contact of released relay 4–RB, through the closed make contact of operated relay 4–R1, the wiper of bank 2 of selector 4–01, over conductor 4–17, through the closed make contacts of operated relays 4–E and 4–V, and through the winding of relay 4–E to negative battery. Thus, when the wiper of bank 2 of selector 4–01 is stepped to a position having ground applied thereto by a contact associated with an operated R relay, it completes a locking circuit for operated relay 4–E to prevent the release of that relay and further stepping of selector 4–01.

Ground from bank 2 of selector 4–01 will also operate the push-button circuit distributor start magnet 4–DSM, over a path extending from ground over conductor 4–16, through contact 4–12 of operated relay 4–R1, the wiper of bank 2, through the closed make contact of operated relay 4–E, through closed contact 4–18 of released relay 4–S, over conductor 4–19 including closed break contacts of released relays 4–W and 4–RB and closed make contact of previously operated relay 4–TRA, and through the winding of relay 4–DSM to negative battery. With the operation of the distributor start magnet 4–DSM, the distributor will begin to rotate and its associated sending cam will close the distributor auxiliary contacts identified by the numeral 4–20 in a manner well known in the art. The closure of distributor auxiliary contacts 4–20 in conductor 4–21 will complete an operating path for relay 4–A, extending from ground through contact 4–20, through closed make contact of operated relay 4–TRB, over conductor 4–21, through closed break contact 4–22 of operated relay 4–ST, over conductor 4–23, through the closed break contacts of released relays 4–A and 4–C, through the winding of relay 4–A, and through resistor 4–24, to negative battery. Operated relay 4–A closes its associated contact 4–25 in operating conductor 4–19 to complete a locking path for the distributor start magnet 4–DSM, thereby to hold that magnet operated.

The operation of relay 4–A also causes the opening of its break contact in operating conductor 4–12, thereby to interrupt the operating path of relay 4–V, which releases. Released relay 4–V opens its contact in conductor 4–17, thereby to interrupt the operating path of relay 4–E which also releases. Relay 4–A locks to ground through its associated closed make contact 4–31 under the control of closed break contact 4–32 associated with released relay 4–C.

The distributor now continues rotation under control of the locked operated distributor start magnet 4–DSM and begins to transmit the first character of the code from its transmitter contacts 5–02 in Fig. 5.

Referring to Fig. 5, relay 5–TRA, in operating, also opens its break contact in conductor 5–20 to remove the shunt across the contacts of the push-button circuit distributor 5–02 and to complete a transmission loop extending from the line over conductor 6–05, through the contacts 1 to 5 of distributor 5–02, over conductor 5–30, through closed break contacts of released relays 4–W and 4–ALA and a closed make contact of operated relay 5–TRB, thence over conductors 3–03 and 6–06 to the line. Operated relay 5–TRA also closes its associated contacts in the circuit of distributor 5–02 contacts 1 to 5 to allow the coding established by banks 4 through 8 of the selector and contacts of relays 4–CA, 4–CB and 4–CC to be applied to distributor contacts 1 to 5. At this point in the operating cycle, relay 5–ST is operated and relays 4–B and 4–C are released. As will be described hereinafter, relay 4–A is operated at this time to count the first or common character transmitted, and relays 4–B and 4–C are operated sequentially to count and respectively establish the second character individual to the station programmed by the selector banks and establish the third or Letters character at the end of each code.

The first character of the code for station 1 associated with position 1 of the selector 4–01 and push-button key 4–PB1 is determined by the cross-connections between terminal 5–03 and terminals 5–04 and the condition of associated relays 4–CA, 4–CB and 4–CC. Referring to bank 1 of selector 4–01, relays 4–CA, 4–CB and 4–CC may be connected through cable 4–30 to particular terminals of bank 1, and will be operated when the grounded wiper of bank 1 steps to these particular terminals. Assuming that only the winding of relay 4–CA is connected to the terminals corresponding to station 1, relay 4–CA will be operated when the selector steps into position 1. Referring to Fig. 5, it will be assumed that the dotted line connections shown between terminal 5–03 and terminals 5–04 are to be used and the establishment of one common call-directing code corresponding to operative relay 4–CA only and the dotted interconnections will be described.

For example, and referring specifically to contact 1 of distributor 5–02, the distribution loop for contact 1 during the transmission of the first character extends from conductor 6–05, over conductor 5–06, through closed break contacts of released relays 4–CB and 4–CC and closed make contact of operated relay 5–CA, over conductor 5–31 through the closed break contacts of released relays 4–B and 4–C, through a closed make contact of operated relay 5–ST, through a closed contact of relay 5–TRA through contact 1 of distributor 5–02 and over conductor 5–30 to the line. The path traced is a complete circuit, therefore, a closed line or mark condition is transmitted as the first pulse of the code. Similarly, the second pulse will be a mark, and pulses 3, 4 and 5 will be spacing. Accordingly, the permutation code combination representing the letter A is transmitted. Similarly, predetermined first characters for all stations may be established by interconnections between terminal 5–03 and terminal 5–04 and the connection of relays 4–CA, 4–CB and 4–CC to particular positions of bank 1. The four various operate and non-operate combinations of these latter relays provide four usable first calling code characters.

Thus as the distributor rotates, the character A is sent to the line. During the stop pulse of the first character transmitted, the distributor auxiliary contacts 4–20 open to remove ground from conductor 4–23 and permit the operation of the second character counting relay 4–B. The operating path for relay 4–B is traced from ground, through closed make contact 4–31 of operated relay 4–A, over conductor 4–34, through the closed break contact of released relay 4–B and resistor 4–35 to negative battery. Prior operation of relay 4–B was prevented by the closed condition of distributor auxiliary contact 4–20 which applied ground over conductors 4–21, 4–23 and 4–34 and through the closed break contact of released relay 4–B to the winding of relay 4–B thereby to shunt the negative operating battery. But with the opening of contact 4–20 this shunting ground is removed and counting relay 4–B operates.

Relay 4–B, operated during the stop pulse of the first character transmitted, now determines the coding of the second character by transferring the distributor 5–02 contacts 1 to 5 to positions on the stepping selector banks 4 through 8. For example, the coding loop for contact 1 extends from that contact through closed make contacts of operated relays 5–TRA and 5–ST, through the closed break contact of released relay 4–C, thence through the closed make contact of operated relay 4–B, over conductor 5–07, and through the corresponding terminal position 1 and wiper of bank 8 to return over conductor 5–06 to the line. Thus when relay 4–B is operated, the transmission loop will be opened or closed to reflect a mark or spacing condition corresponding to the presence or absence of an interconnection between conductor 5–07 and the wiper of bank 8 at the selector position corresponding to the character transmitted. Accordingly, with relay 4–B operated, the characters transmitted by distributor contacts 1 to 5 are determined by the strapping of selector banks 4 through 8 of selector 4–01.

The distributor start magnet 4–DSM, held operated through contact 4–25 associated with operated relay 4–A, allows the sending cam to make another revolution, thereby to transmit the second station calling code character. The distributor auxiliary contacts 4–20 close to apply ground over conductor 4–21, through contact 4–22 and over conductors 4–23 and 4–34 to the battery side of the winding of relay 4–A, through closed break contacts of operated relay 4–B, thereby to force the release of relay 4–A. The second character of the code is now being transmitted.

During the stop pulse of that second character, the distributor auxiliary contacts 4–20 open to cause the operation of relay 4–C by removing the grounding shunt applied over conductors 4–21, 4–23 and 4–36 to the battery side of relay 4–C, through its associated break contact. This operating circuit extends from negative battery through resistor 4–37, the winding of relay 4–C, closed break contact of released relay 4–A, and through the closed make contact of relay 4–B to ground. Operated relay 4–C closes its contacts in the coding circuit of Fig. 5, thereby to establish the character Letters on the contacts of distributor 5–02. For example, contact 1 is extended through closed break contacts of operated relay 5–TRA and 5–ST to the transfer contacts of relay 4–C, and with relay 4–C operated, it is extended through the closed make contact thereof over conductors 5–32 and 5–06 to conductor 6–05, thereby completing the transmission loop. Thus with relay 4–C operated, the coding circuitry associated with relays 4–B, 4–CA, 4–CB and 4–CC and banks 4 to 8 of the selector is by-passed, and a closed loop or marking condition is transmitted for each of the selectable elements associated with contacts 1 to 5 of distributor 5–02 which comprises the permutation code combination of the Letters signal.

The distributor start magnet 4–DSM is still held operated by the operated 4–B relay and allows the sending cam to make a third revolution and transmit the Letters character. The distributor auxiliary contacts 4–20 close at the beginning of this third revolution to apply ground over conductors 4–21, 4–23 and 4–36 to the battery side of relay 4–B, through the closed make contact of operated relay 4–C and effect the release of relay 4–B. Relay 4–B releases and opens its associated locking contact 4–41 in parallel with make contacts 4–25 of relay 4–A in the operating circuit of relay 4–DSM, thereby to effect the release of that relay. When relay 4–B releases, it removes ground from the winding of relay 4–C. However, with contacts 4–20 closed, ground is simultaneously applied over conductor 4–23 to hold relay 4–C operated. During the stop pulse of the Letters character, contacts 4–20 reopen to cause the release of relay 4–C which restores the relays 4–A, 4–B and 4–C counting chain to normal and transfers the control of coding to the 4–CA, 4–CB and 4–CC relays.

If the code transmitted is of a routing nature in that it is the code of a station to which the message is to be relayed, contacts AV and BV of sequential selector 3–00 will remain closed and a circuit will be complete from ground over conductors 3–43 and 4–12, through the closed break contacts of the counting chain relays 4–A, 4–B and 4–C to energize relay 4V which, upon operation, will as hereinbefore described effect the stepping of selector 4–01 to the next position.

With reference to operating conductor 4–12 of relay 4–V, it is to be noted that relay 4–V, which initiates the stepping of selector 4–01 to the next position, cannot be energized unless counting relays 4–A, 4–B and 4–C are coincidentally released and ground is applied to conductor 4–12, through either a contact of operated relay 4–W or the closed AV and BV contacts of sequential selector 3–00.

However, if the code is a non-routing one directed to a particular station on the system such as station 6–04, the contacts AV or BV in the sequential selector 3–00 of Fig. 3 at the sending station 6–03, transmitted will open during the transmission of that second character in response to the first character received. If AV is the operating contact, its opening will prevent the operation of relay 4–V over the operating path hereinabove traced. However, the AV contact in conductor 3–43 will reclose in response to the V answer-back signal when received to complete the operating circuit for relay 4–V which operates to effect the operation of relay 4–S, the operation of relay 4–E and the subsequent release of relay 4–S to cause the single stepping of selector 4–01 as previously described. Stepping selector 4–01 will now continue to step as hereinabove described until the wiper associated with bank 2 thereof rests on a terminal to which ground has been applied by the depression of a particular push-button and the operation of the corresponding R relay; at which position the hereinabove described calling operation for that station will be repeated.

*Automatic station calling code report*

In the event that the V answer-back signal is not received by the sending station 6–03 within two seconds after the transmission of the station calling code, timing tube 5–T is forced conductive and operates relay 5–P. With the line idle relay 3–L in the marking condition, its associated contact 5–21 in Fig. 5 is opened and inasmuch as relay 5–TRB is operated its contact 5–22 is also opened, thereby to allow condenser 5–23 to charge through resistor 5–24. The circuit parameters of this timing network are such that tube 5–T will be forced conductive whenever the foregoing condition is maintained for a period of two seconds. Relay 5–P operates to negative battery through tube 5–T and immediately locks to ground over conductor 5–25 through its associated make contacts and closed break contacts of released relays 4–RA and 4–A. A break contact associated with operated relay 5–TRB is in shunt of relay 5–P and consequently the release of relay 5–TRB or the operation of relays 4–RA or 4–A will effect the release of relay 5–P.

Relay 5–P also operates to close its associated make contact 4–38 of Fig. 4, thereby to operate relay 4–DSM, over a path extending from ground, through contact 4–38, a closed break contact of released relay 5–ALB, closed make contact of relay 5–ST, closed break contact of relay 4–RB, closed make contact of operated relay 5–TRA, the winding of relay 4–DSM to negative battery. The distributor start magnet operates to free the sending cam of distributor 5–02 which begins its first revolution to transmit the first character and in so doing closes distributor auxiliary contact 4–20 to energize relay 4–A. Relay 4–A operates to open its contact in operating conductor 5–25 thereby to release relay 5–P. When relay 5–P releases the closure of its associated contact in operating conductor 5–27 operates relay 5–ALB.

The equipment now proceeds to transmit the repeated station start code and after the transmission is complete, the equipment again awaits the V answer-back signal. If no response is received to the repeated code, tube 5–T will again conduct at the end of two seconds and reoperate relay 5–P. Relay 5–ALB previously operated to transfer its operating path to operating conductor 5–26 for relay 5–ALA and therefore both relays are held operated after relay 5–P operates. The grounded no-response alarm lamp 4–42 is operated over operating conductor 4–06 from negative battery through closed make contacts of operated relays 5–P and 5–ALB.

Operated relay 5–ALB also prevents reoperation of distributor start magnet 4–DSM by maintaining its associated break contact 4–43 in the operating path thereof opened. Thus, the distributor is prevented from repeating a calling code for the third time.

Operated relay 5–ALB completes at its make contact 5–33 a circuit from ground through the closed make contact of operated relay 5–P, through the closed break contact of relay 5–FL, through the winding of relay 5–FLA to negative battery, thereby to operate relay 5–FLA. Relay 5–FLA closes its associated make contact in the parallel operating circuit of relay 5–FL which operates and in turn releases relay 5–FLA. Relay 5–FLA in releasing in turn releases relay 5–FL. This interaction repeats and relays 5–FLA and 5–FL are alternately operated. The associated contact of relay 5–FLA in the circuit of the wiper of bank 3 will be alternately opened and closed, thereby to cause the flashing of the station lamp associated with the step on which the wiper arm of bank 3 is resting.

The operator at the sending station noting the no answer-back alarm condition from the flashing lamp adjacent to the push-button corresponding to the station called, may now if desired send the character V over the line from the sending station teletypewriter keyboard which will be received by selector magnet 3–01, thereby to effect the operation of relay 4–V and the stepping of the selector to the next position. Relay 4–V operates to open its contact in operating conductor 5–26 to cause the release of relay 5–ALA. The alarm condition is extinguished during the sending of the next station calling code when relay 4–A is operated. Relay 4–A operated opens its contact in conductor 5–25 to release relay 5–P which in turn opens its contacts in operating conductor 5–27 to release relay 5–ALB and its contact in the operating circuit of relays 5–FLA and 5–FL, opens thereby to release those relays. If the station to be omitted is the last station in the sequence an alarm condition will be extinguished as the selector reaches position 42 whereat ground from bank 1 will operate relay 4–RA, over conductor 4–52 which will open its associated contact in conductor 5–25 to interrupt the operating circuit of relay 5P which will in turn extinguish relays 5–ALB, 5–FL and 5–FLA.

As previously described, if the operator fails to send character V from the keyboard within eight seconds or if a break is received during tape transmission and is not released within ten seconds, the transmitter start equipment will send Figs. H Letters V to the line. Relay 2–P in the transmitter start circuit of Fig. 2 will be operated in response to this idle line condition and will operate relay 4–RB by closing its contact 4–50 in Fig. 4. However, this will only occur in the case of the transmitter start circuit and the push-button circuit both being incorporated at the principal station.

If the operator depresses a wrong push-button, she may cancel by depressing the cancelled key 4–CA which will open its associated contact 4–51 in conductor 4–02 to release relay 4–PB. The release of relay 4–PB will, as previously described, effect the release of all operated R relays and station lamps.

When all directing codes have been transmitted, the selector will step to position 42. At position 42 ground will be applied through the wiper of bank 1, over conductor 4–52 to energize relay 4–RA. Relay 4–RA, upon operating, will open its break contact 4–52 to remove ground from conductor 4–04, thereby to cause the release of operated relay 4–PB. Released relay 4–PB will open its make contact in conductor 4–05, thereby to deenergize the station lamps and the R relays. A make contact associated with released relay 4–PB will also open the operating circuit for start relay 5–ST which releases. Released relay 5–ST transfers the coding of the distributor 5–02, contacts to the selector banks 4 through 8 of selector 4–01 over conductor 5–07 by by-passing the transfer contacts of relays 4–B and 4–C and therefore the remaining code characters will be transmitted to the line on a single letter basis.

The release of relay 5–ST also transfers at its contacts 4–22 the distributor auxiliary contacts 4–20 from the counting circuit comprising relays 4–A, 4–B and 4–C to the operating winding of relay 4–S, the selector stepping magnet. Inasmuch as ground is not applied to position 42 on bank 2 of stepping selector 4–01, the selector will step to position 43. Ground from bank 2 on position 43 will operate distributor start magnet 4–DSM, over an operating path previously traced and the distributor begins to rotate and will send the characters Carriage Return which are established on banks 4 through 8. As the distributor begins to rotate, the auxiliary contacts 4–20 close to operate relay 4–S. During the stop pulse, the distributor auxiliary contacts will open releasing relay 4–S and selector 4–01 will step to position 44. Ground on position 44 of bank 2 will reoperate the distributor stop magnet 4–DSM and in this instant the banks 4 through 8 will be coded to send Line Feed. Position 45 will send letters in a like manner. When the selector reaches position 46 ground is applied in bank 1 over conductor 4–54 to relay 4–W causing the operation of that relay. Operation of relay 4–W opens its make contact 4–55 in conductor 4–19 to cause the release of relay 4–DSM. Relay 4–DSM is now prevented from operating on ground applied by the wiper of bank 2 of selector 4–01. Relay 4–W in operating closes its contact 3–64 in Fig. 3 to energize start magnet 3–46 which will start the tape transmitter 3–37 or unlock the keyboard transmitter 3–36 in the event manual transmission is desired. The message is then transmitted and when the tape runs out of the transmitter the sixth pin releases stopping the transmitter.

Relay 3–L follows signals transmitted over the line and its associated break contact in Fig. 5 identified by the numeral 5–31 will allow condenser 5–23 to charge and cause conduction in tube 5–T if the line remains idle for two seconds. After two seconds of idle line time tube 5–T will fire to operate relay 5–P over a circuit extending from negative battery through tube 5–T through the winding of relay 5–P to positive battery. Relay 5–P in operating will close an operating circuit for relay 4–DSM extending from ground through contact 4–38 of operated relay 5–P through the closed make contact 4–55 of operated relay 4–W, over conductor 4–19 through the winding of relay 4–DSM to negative battery. The operation of distributor start magnet 4–DSM will cause the transmitting contacts of distributor 5–02 to send Figures to the line. The selector will then step to position 48 thereby releasing relay 4–W and on position 48 banks 4 through 8 will cause the sending of an H to the line. Position 49 will send Letters in the same manner.

The selector then steps to position 50 where ground from bank 1 will operate relay 4–RB which locks through its contact 4–56 and contact 4–57 of operated relay 5–ST to ground. Relay 4–RB in operating removes at its open break contact 5–35 operating battery from the winding of relays 5–TRB and 5–TRA which release. Relay 5–TRA in releasing opens its contact in conductor 4–12 to release relay 4–V. Relay 5–TRB in releasing reapplies a shunt across relay 5–P to cause the release of this relay. The selector 4–01 failing to find ground on position 50 of bank 2 due to open break contact 4–58 of operated relay 4–RB will step to its off-normal position 51. Relay 4–S releases and opens its contact 4–59 in the locking circuit for relay 4–RB which in turn releases. The release of relay 4–RB restores the circuit to normal.

With the push-button circuit restored to normal, an idle condition will appear on the line and the transmitter start circuit of principal station 6–02 will seize the circuit and resume transmission of start patterns as previously described.

Although a particular embodiment of this invention has been disclosed herein and described in the foregoing specification, it will be understood that the invention is not limited to such specific embodiments but is capable of modification and rearrangement without departing from the spirit of the invention.

What is claimed is:

1. In a teletypewriter station selection and control system, a communication circuit, a plurality of teletypewriter stations each including a teletypewriter receiver and a signal responsive selective mechanism which is interconnected between said communication circuit and said teletypewriter for effecting the selective completion of a receiving connection between said communication circuit and said teletypewriter in response to station selection signals appearing on said communication circuits, means for transmitting signals representing codes for selecting said receivers, means for arresting said transmitter after transmission of each receiver selecting code, means responsive to the selection of any receiver for generating and transmitting on said circuit an acknowledgement signal, and means responsive to said acknowledgment signal for restarting said transmitter.

2. A system in accordance with claim 1 having means for causing a particular one only of said teletypewriter stations to transmit on said circuit an acknowledgment signal in response to a multistation selecting signal.

3. A system in accordance with claim 1 having means at a particular station for generating a disconnect signal to release any selected station and to dismiss the arrested transmitter upon failure of a selected station to transmit said acknowledgment signal.

4. A system in accordance with claim 1 having means for precluding transmission of an acknowledgment signal by all but one of said stations in response to a multistation call signal.

5. In a telegraph system, a transmission channel, a plurality of message receiving stations connectable in message receiving relation thereto, means for transmitting signals representing characters over said channel, selector means at each station adapted to effect connection of said station to said channel in response to sequences of signals representing at least two characters, generating means associated with said selector means for generating an acknowledgment signal when a selection has been effected, and means for causing the generating means associated with a particular one only of said plurality of stations to generate an acknowledgment signal in response to a common selecting code representing all of the stations on said channel.

6. In a teletypewriter station selection and control system arranged to accommodate the transmission of sequences of signals comprising a permutation of at least two address character codes designating each station, end-of-address codes, message text codes, and a predetermined sequence of codes designating end of message, a transmission channel, a plurality of receiving stations each having a receiving instrumentality connectable to said channel, a control station also having a receiving instrumentality connectable to said channel, a selector means at each station responsive to the character codes designating stations for selectively connecting the designated receiving instrumentalities, means responsive to the end-of-address codes for stopping further selective connection of instrumentalities to said channel, means responsive to said end-of-message codes to disconnect the connected instrumentalities, means operable incident to said disconnection for requalifying said selector means to operate, and means provided at said control station for generating said end-of-message codes when said communication circuit is idle for a predetermined period.

7. In a telegraph system, a transmission channel, a plurality of transmitters associated therewith and individually conditionable to transmit messages, a principal station associated with said channel and having means to receive signals from said transmitters, transmitting means at said principal station for transmitting code transmitter designating code signals, means responsive to each of said transmitter designating code signals for causing the designated transmitter to initiate message transmission when conditioned therefor or to transmit an acknowledgment signal if not so conditioned, other means for precluding starting of a conditioned transmitter in response to the first sending of its designating code and for causing said transmitter to start in response to the next successive sending of the same code.

8. In a telegraph system, a principal station, a plurality of outlying transmitters, signal receiving means at said principal station adapted to receive from said outlying transmitters, roll call signal transmission means at said principal station for inviting message transmission by said transmitters individually, means responsive to received transmission of a reply signal one kind from a transmitter for causing said roll call signal transmission means to proceed with its roll call, means responsive to received transmission of a reply signal of a different kind for causing said roll call signal transmission means to proceed with its roll call after a predetermined delay interval, means responsive to incoming transmission of a message nature for suspending said roll call, and means responsive to each end-of-message signal for causing said roll call transmission means to begin another roll call.

9. In a teletypewriter station selection and control system, a communication circuit, a plurality of teletypewriter stations provided with signal responsive selector mechanisms associated with said circuit and teletypewriter receivers selectively associable with said circuit by said selector mechanisms, at least one record controlled transmitter associated with said circuit and adapted to transmit under control of a record medium containing signal indicia representing codes for selecting said receivers and/or message material, key controlled means usable in lieu of said record controlled transmitter for generating codes for selecting said receivers, means for arresting said transmitter or generator after the transmission of each receiver selecting code, means responsive to the selection of any receiver for transmitting on said circuit an acknowledgment signal, and means responsive to said acknowledgment signal for restarting said transmitter or generator.

10. In a telegraph system, a principal station, a plurality of subordinate stations having transmitters associated therewith, a transmission channel common to said principal and subordinate stations, roll call transmission means at said principal station for initiating message transmission over said channel by said transmitters individually, means for conditioning said transmitters in a plurality of ways, selectively responsive means for initiating operation of an individual transmitter conditioned in one of said ways in response to the first polling thereof, means for initiating operation of an individual transmitter conditioned in another of said ways in response to the next successive polling thereof, means associated with each of said transmitters for generating an acknowledgment signal responsive to its polling signal, means for precluding generation of said acknowledgment signal when a transmitter has been conditioned in said one of said ways, and means for precluding the operation of any transmitter conditioned in said other way in response to the next successive polling thereof if a transmitter conditioned according to said one way has been started during the interval between said first and said next successive polling.

11. A system in accordance with claim 10 in which there is additionally provided means for suspending said roll call transmission after transmission of each individual calling code, means responsive to said acknowledgment signals for causing said roll call transmission means to proceed with the transmission of calling codes, means responsive to signals other than acknowledgment signals for prolonging the suspension of said roll call transmission, and other means for precluding the starting of a transmitter conditioned according to said other way in response to the next successive polling thereof if prolonged suspension of said roll call transmission occurs subsequent to said first polling and prior to said next successive polling of that transmitter.

12. A system in accordance with claim 11 in which there is additionally provided means for invariably limiting the signals transmitted during periods of prolonged suspension of said roll call transmission means to those comprising a single message.

13. In a telegraph station selector system, a transmission channel, a plurality of stations, signal responsive selector means at each station for effectively associating the respective stations with said channel, signal generating means at at least one of said stations for generating station selecting signals, means at each of said stations operable upon selection thereof in response to its selecting code for generating and transmitting an acknowledgment signal, and means effective upon failure of a station to transmit the acknowledgment signal for causing said station selecting signal generating means to generate the particular station selecting signal repetitiously.

14. A system according to claim 13 in which the station selecting signal generating means is arranged to effect only a single repetitious generation of any station selecting signal.

15. A system according to claim 14 in which there is additionally provided means effective upon failure of a station to transmit the acknowledgment signal in response to the repetitious generation of that station's selecting signal for suspending operation of said signal generating means, other acknowledgment signal generating means to cause resumption of operation of said signal generating means, and means for dismissing said signal generating means when operation remains suspended for a predetermined interval.

16. In a telegraph transmitter control system, a transmission channel, a plurality of transmitters associated therewith and adapted to transmit under control of a storage record medium including an end-of-message signal following a sequence of message intelligence signals, means for registering preparedness of said transmitters to transmit, means for initiating operation of prepared transmitters in sequence to cause transmission therefrom one at a time over said channel, and selector means associated with each transmitter and responsive to signals generated by the transmitter to effect stopping thereof upon response of the selector mechanism to said end-of-message signal.

References Cited in the file of this patent

UNITED STATES PATENTS

| | | |
|---|---|---|
| 2,664,459 | Oberman | Dec. 29, 1953 |
| 2,667,533 | Zenner | Jan. 26, 1954 |
| 2,735,884 | Blanton et al. | Feb. 21, 1956 |
| 2,738,376 | Vernam et al. | Mar. 13, 1957 |